(12) United States Patent
Tsuzuki et al.

(10) Patent No.: US 8,108,407 B2
(45) Date of Patent: Jan. 31, 2012

(54) INFORMATIONN RETRIEVAL APPARATUS

(75) Inventors: Takashi Tsuzuki, Osaka (JP); Kenji Mizutani, Nara (JP); Kazutoyo Takata, Osaka (JP); Satoshi Matsuura, Kyoto (JP)

(73) Assignee: Panasonic Corporation, Osaka (JP)

( * ) Notice: Subject to any disclaimer, the term of this patent is extended or adjusted under 35 U.S.C. 154(b) by 270 days.

(21) Appl. No.: 12/447,333

(22) PCT Filed: Nov. 6, 2007

(86) PCT No.: PCT/JP2007/071528
§ 371 (c)(1),
(2), (4) Date: Apr. 27, 2009

(87) PCT Pub. No.: WO2008/056651
PCT Pub. Date: May 15, 2008

(65) Prior Publication Data
US 2010/0100541 A1 Apr. 22, 2010

(30) Foreign Application Priority Data
Nov. 6, 2006 (JP) ................................ 2006-300187

(51) Int. Cl.
*G06F 7/00* (2006.01)
(52) U.S. Cl. ........................................ 707/749; 707/750
(58) Field of Classification Search .................. 707/748, 707/749, 750, 751, 736, 737
See application file for complete search history.

(56) References Cited

U.S. PATENT DOCUMENTS
2003/0126561 A1* 7/2003 Woehler et al. ............... 715/531
2005/0165777 A1* 7/2005 Hurst-Hiller et al. ............. 707/4
2005/0289599 A1 12/2005 Matsuura et al.
2008/0288489 A1* 11/2008 Kim .................................. 707/6

FOREIGN PATENT DOCUMENTS

| JP | 5-282367 | 10/1993 |
|---|---|---|
| JP | 5-314182 | 11/1993 |
| JP | 8-6965 | 1/1996 |
| JP | 8-30630 | 2/1996 |
| JP | 10-162012 | 6/1998 |
| JP | 2003-16106 | 1/2003 |

(Continued)

OTHER PUBLICATIONS

International Search Report issued Dec. 4, 2007 in the International (PCT) Application of which the present application is the U.S. National Stage.
Yoshiki Niwa, "*Dynamic Co-occurrence Analysis for Interactive Document Retrieval*", Information Processing in Japan, Journal of Information Processing, vol. 96, No. 87, pp. 99-106, Sep. 13, 1996 (with partial English translation).

(Continued)

*Primary Examiner* — Amy Ng
(74) *Attorney, Agent, or Firm* — Wenderoth, Lind & Ponack, L.L.P.

(57) ABSTRACT

An information retrieval apparatus, which can present to a user only a related word matching a user search intent, includes: an associative dictionary storage unit for storing words included in plural pieces of text to be searched and relevance degrees between the words; an appearance frequency storage unit for storing an appearance frequency that is the number of pieces of text in which the words stored in the associative dictionary storage unit appear, among the plural pieces of text to be searched; and a related word obtaining unit that obtains a related word to be presented to the user, from the relevance degree between the search word entered by the user and another word among the words, the appearance frequency, and the user search intent.

13 Claims, 33 Drawing Sheets

FOREIGN PATENT DOCUMENTS

| | | |
|---|---|---|
| JP | 2004-118378 | 4/2004 |
| JP | 2004-164662 | 6/2004 |
| JP | 2004-362121 | 12/2004 |
| JP | 2005-135113 | 5/2005 |
| JP | 2005-310094 | 11/2005 |
| JP | 2005-348071 | 12/2005 |
| WO | 2005/066838 | 7/2005 |

OTHER PUBLICATIONS

First Reply in the International (PCT) Application of which the present application is the U.S. National Stage (with English translation).

* cited by examiner

FIG. 4

102A Associative dictionary storage unit

| Related word 1 | Related word 2 | Relevance degree |
|---|---|---|
| Taro Matsushita | Jiro Matsushita | 80 |
| Taro Matsushita | Hanako Matsushita | 70 |
| Taro Matsushita | Saburo Matsushita | 45 |
| Taro Matsushita | Shiro Matsushita | 30 |
| Taro Matsushita | Goro Matsushita | 40 |
| Jiro Matsushita | Saburo Matsushita | 30 |
| ⋮ | ⋮ | ⋮ |

FIG. 5

102B Appearance frequency storage unit

| Word | Appearance frequency |
|---|---|
| Taro Matsushita | 50 |
| Jiro Matsushita | 60 |
| Hanako Matsushita | 20 |
| Saburo Matsushita | 90 |
| Shiro Matsushita | 15 |
| Goro Matsushita | 10 |
| ⋮ | ⋮ |

FIG. 6

User search intent threshold storage unit ~103

| User search intent (remote-control button function) | Relevance degree threshold | | Appearance frequency threshold | |
|---|---|---|---|---|
| | Lower limit | Upper limit | Lower limit | Upper limit |
| Refinement mode | 51 | 100 | 10 | 50 |
| Information coverage mode | 51 | 100 | 51 | 100 |
| Discovery mode | 10 | 50 | 10 | 50 |
| Unknown boom acquisition mode | 10 | 50 | 51 | 100 |
| .. | .. | .. | .. | .. |

FIG. 9

Appearance frequency storage unit — 102B

| Word | Text ID |
|---|---|
| Taro Matsushita | 1, 3, 6, 9 |
| Jiro Matsushita | 1, 3, 9, 10, 11, 12 |
| Hanako Matsushita | 1, 6 |
| Saburo Matsushita | 1, 4, 5, 7, 8, 10, 13, 14, 15 |
| Shiro Matsushita | 3, 4 |
| Goro Matsushita | 9 |
| ... | ... |

View search results

Results 1-10 of 50

1. Program name: "Taro Matsushita goes round the world 1"
2. Program name: "Taro Matsushita goes round the world 2"
3. Program name: "Taro Matsushita goes round the world 3"
4. Program name: "Taro Matsushita goes round the world 4"
5. Program name: "Taro Matsushita goes round the world 5"
6. Program name: "Taro Matsushita's Feel ENGLISH 1/20"
7. Program name: "Taro Matsushita's Feel ENGLISH 2/20"
8. Program name: "Taro Matsushita's Feel ENGLISH 3/20"
9. Program name: "Taro Matsushita's Feel ENGLISH 4/20"
10. Program name: "Taro Matsushita's Feel ENGLISH 5/20"

Previous    Next

FIG. 12

Related word view (Refinement mode)

Related words for "Taro Matsushita"

1. Hanako Matsushita

FIG. 13

Related word view (Discovery mode)

Related words for "Taro Matsushita"

1. Shiro Matsushita
2. Goro Matsushita

Search result view

Results 1-10 of about 10

1. Program name: "Taro Matsushita's Seven Wonders of the World 1"
2. Program name: "Taro Matsushita's Seven Wonders of the World 2"
3. Program name: "Taro Matsushita's Seven Wonders of the World 3"
4. Program name: "Taro Matsushita's Seven Wonders of the World 4"
5. Program name: "Taro Matsushita's Seven Wonders of the World 5"
6. Program name: "Taro Matsushita's Seven Wonders of the World 6"
7. Program name: "Taro Matsushita's Seven Wonders of the World 7"
8. Program name: "Pure romance drama special (1/3)"
9. Program name: "Pure romance drama special (2/3)"
10. Program name: "Pure romance drama special (3/3)" (final episode)

Previous   Next

FIG. 16

User search intent threshold storage unit 103

| User search intent | | Relevance degree threshold | | Appearance frequency threshold | |
|---|---|---|---|---|---|
| Day of the week | (Time zone) | Lower limit | Upper limit | Lower limit | Upper limit |
| Mon to Fri | 6:00~8:00 | 51 | 100 | 10 | 50 |
| Mon to Fri | 8:00~13:00 | 51 | 100 | 51 | 100 |
| Mon to Fri | 13:00~17:00 | 10 | 50 | 10 | 50 |
| Mon to Fri | 17:00~6:00 | 51 | 100 | 51 | 100 |
| Sat and Sun | 0:00~17:00 | 10 | 100 | 10 | 100 |
| Sat and Sun | 17:00~24:00 | 51 | 100 | 10 | 50 |

FIG. 19

Relevance degree threshold

| | Lower limit | | Upper limit |
|---|---|---|---|
| Refinement mode button: | 51 | ~ | 100 |
| Information coverage mode button: | 51 | ~ | 100 |
| Discovery mode button: | 10 | ~ | 50 |
| Unknown boom acquisition mode: | 10 | ~ | 50 |

Appearance frequency threshold

| | Lower limit | | Upper limit |
|---|---|---|---|
| Refinement mode button: | 10 | ~ | 50 |
| Information coverage mode button: | 51 | ~ | 100 |
| Discovery mode button: | 10 | ~ | 50 |
| Unknown boom acquisition mode: | 51 | ~ | 100 |

[Update] [Cancel]

User search intent: [Refinement mode button]

Search word: [Taro Matsushita]

Related word:

| Related word | Relevance degree | Appearance frequency |
|---|---|---|
| Hanako Matsushita | 70 | 20 |
| Goro Matsushita | 40 | 10 |

Threshold

| | Lower limit | | Upper limit |
|---|---|---|---|
| Relevance degree threshold: | 40 | ~ | 80 |
| Appearance frequency threshold: | 10 | ~ | 30 |

[Update] [Cancel]

User search intent threshold storage unit — 103

| User search intent (remote-control button function) | Relevance degree threshold | | Appearance frequency threshold | |
|---|---|---|---|---|
| | Lower limit | Upper limit | Lower limit | Upper limit |
| Refinement mode | 40 | 80 | 10 | 30 |
| Information coverage mode | 51 | 100 | 51 | 100 |
| Discovery mode | 10 | 50 | 10 | 50 |
| Unknown boom acquisition mode | 10 | 50 | 51 | 100 |
| .. | .. | .. | .. | .. |

FIG. 26

| Words | Viewing frequency |
|---|---|
| Taro Matsushita | 10 |
| Jiro Matsushita | 10 |
| Hanako Matsushita | 2 |
| Saburo Matsushita | 2 |
| Shiro Matsushita | 5 |
| Goro Matsushita | 0 |
| : | : |

FIG. 27

| Viewing frequency | Threshold change width |
|---|---|
| 0 to below 5 | +10 |
| 5 to below 10 | 0 |
| 10 and over | -10 |

FIG. 29

User search intent threshold storage unit 604

Initial threshold condition

| User search intent (Remote-control button function) | Relevance degree threshold | | Appearance frequency threshold | |
|---|---|---|---|---|
| | Lower limit | Upper limit | Lower limit | Upper limit |
| Refinement mode button | 51 | 100 | 10 | 50 |
| Information coverage mode button | 51 | 100 | 51 | 100 |
| Discovery mode button | 10 | 50 | 10 | 50 |
| Unknown boom acquisition mode | 10 | 50 | 51 | 100 |
| ... | ... | ... | ... | ... |

Changed threshold condition

| User search intent (Remote-control button function) | Relevance degree threshold | | Appearance frequency threshold | |
|---|---|---|---|---|
| | Lower limit | Upper limit | Lower limit | Upper limit |
| Refinement mode button | 41 | 100 | 10 | 50 |
| Information coverage mode button | 41 | 100 | 51 | 100 |
| Discovery mode button | 10 | 40 | 10 | 50 |
| Unknown boom acquisition mode | 10 | 40 | 51 | 100 |
| ... | ... | ... | ... | ... |

FIG. 33

Related words for "Taro Matsushita"

1. Hanako Matsushita (score: 56)
2. Goro Matsushita (score: 36)
3. Jiro Matsushita (score: 32)
4. Shiro Matsushita (score: 25.5)

Search condition history storage unit — 601

| Word | Word type |
|---|---|
| Taro Matsushita | Personal name |
| Jiro Matsushita | Personal name |
| drama | Genre |
| variety | Genre |
| drama | Genre |
| Japan | Region, Country |
| : | : |

FIG. 36

Input tendency weight value storage unit — 602

| Word type | Ratio |
|---|---|
| Personal name | 0.3 |
| Genre | 0.3 |
| Region, Country | 0.1 |
| Occupational title | 0.1 |
| Program name | 0.2 |

FIG. 37

Related words for "Goro Matsushita"

1. variety (score: 15)
2. Jiro Matsushita (score: 9)

201

INFORMATIONN RETRIEVAL APPARATUS

TECHNICAL FIELD

The present invention relates to an information retrieval apparatus that outputs text matching a search word entered by a user, and relates particularly to an information retrieval apparatus that outputs a related word relevant to the search word along with search results.

BACKGROUND ART

Conventionally, an information retrieval apparatus has been proposed as an apparatus that can present to a user a related word relevant to a search word entered by the user (for example, see Patent Reference 1). When the user enters the keyword, the information retrieval apparatus searches the number of cases in which a search formula specified by the entered keyword is established. Along with this, the information retrieval apparatus generates a related word for the search formula and obtains the number of cases in which a new search formula including the search formula and the generated related word is established, so as to present the number to the user.

In addition, a text classification apparatus has been suggested which allows automatic setting of a keyword for a second search only by specifying the keyword for a first search, which is entered by the user (for example, see Patent Reference 2). The sentence classification apparatus presents to the user, as a keyword for the second search, a word which is present in the same text as the keyword for the first search entered by the user and is different from the keyword for the first search present in other text, and which has a high appearance frequency.

Patent Reference 1: Japanese Unexamined Patent Application Publication No. 5-314182
Patent Reference 2: Japanese Unexamined Patent Application Publication No. 10-162012

SUMMARY OF THE INVENTION

Problems that Invention is to Solve

However, a conventional apparatus that presents a related word (keyword for the second search) can only present to the user the number of search results simply by presenting, along with the related word, the number of the results of the search in which the related word is added to the search formula or the number of the results of the search using the related word. Thus, the conventional apparatus cannot present, in consideration of the number of search results, the related word to the user in accordance with the search intent of the user (for example, when the user is in a hurry and has no time to carefully examine the search results, the user has to determine which information to export to a mobile terminal device or the like). Thus, the user has to recognize the search results of the related word presented and select an appropriate related word for the intended (exportable) number of the search results, or to consider and input a search word that allows further reduction in the number of the search results. FIG. 1 shows an example of the display in this case.

FIG. 1 shows a search word "information" entered by the user and 20568 search results obtained for the search word. Shown below them is the number of search results obtained when a related word relevant to the search word is selected. For example, the figure shows that 9321 results have been found in the search when a related word "search" is used for further search. In this case, the user has to select, based on the number of the search results, a related word appropriate for the intended number of the search results.

In addition, the conventional apparatus presents to the user related words in order, from related words strongly relevant to the search word entered by the user to related words weakly relevant to the search word. Thus, when the user has plenty of free time and wants to obtain information other than the information that the user usually views or browses, the user has to browse all the related words presented and obtain a related word heuristic and weakly relevant to the entered search word from among the related words. FIG. 2 shows an example of the display in this case.

As FIG. 2 shows, related words for a search word "wine" are shown in order of strong relevance to the search word. For example, the related word having a strongest relevance to the search word "wine" is "French Bordeaux". However, the screen in FIG. 2 only displays related words having strong relevance. Thus, in order to select a heuristic related word having weak relevance to the search word, the user has to search for an intended related word by scrolling the viewing area with a scroll bar on the screen, to select the intended related word from among all the related words.

As described above, in the conventional apparatus, the user has to enter or select a word for further refining the search results when, for example, a large number of results are found in the search. However, when there is no time for such refinement, many related words having a large number of search results are presented. Therefore, the user has to browse a related word list and select a related word that allows obtainment of a sufficiently small number of results which do not require further refinement.

In addition, a large number of related words having strong relevance are also presented in the case where the user has sufficient time to browse the content, and when, although time-consuming, the user wants to obtain, from the search word entered by the user, a related word which sounds unpredictable and heuristic to the user and has weak relevance to the search word inputted by the user. For this reason, in order to select such a heuristic related word, the user has to find, by browsing the related word list, or recall the heuristic related word.

Thus, the present invention is conceived in view of the above circumstances, and it is the object of the present invention to provide an information retrieval apparatus that can present to the user, in obtaining a related word relevant to the search word, a related word having an appropriate number of search results and appropriate relevance to the search word, in accordance with the search intent of the user.

Means to Solve the Problems

An information retrieval apparatus according to an aspect of the present invention is an information retrieval apparatus that retrieves a piece of text from plural pieces of text to be searched, and the information retrieval apparatus includes: an associative dictionary storage unit in which two arbitrary words and a relevance degree are stored in association with each other, the two arbitrary words being among words included in the plural pieces of text to be searched, and the relevance degree indicating strength of relevance between the two arbitrary words; an appearance frequency storage unit in which a word and an appearance frequency are stored in association with each other, the word being among the words stored in the associative dictionary storage unit, and the appearance frequency being the number of pieces of text in which the word appears, among the plural pieces of text to be searched; a search word acceptance unit that accepts a search word; a user search intent obtaining unit that obtains a user search intent that indicates a search intent of a user; a user search intent threshold storage unit in which the user search intent, a threshold condition for the relevance degree and a threshold condition for the appearance frequency are stored in association with each other, the threshold condition for the relevance degree and the threshold condition for the appearance frequency corresponding to the user search intent; a related word obtaining unit that obtains, as a related word relevant to the search word, a word for which the relevance degree with respect to the search word and the appearance frequency satisfy, respectively, the threshold condition for the relevance degree and the threshold condition for the appearance frequency which correspond to the user search intent, the relevance degree being stored in the associative dictionary storage unit, and the appearance frequency being stored in the appearance frequency storage unit; and a retrieval unit that retrieves a piece of text including the search word or the related word from the plural pieces of text to be searched.

According to the configuration, the related word relevant to the search word is obtained based on the relevance degree with respect to the search word and the appearance frequency. The unpredictability of the related word increases as the relevance degree decreases, and the number of search results increases as the frequency appearance increases. For this reason, it is possible to obtain related words matching a variety of search intent of the user by using the relevance degree and the appearance frequency. In addition, it is possible to obtain related words matching the user search intent by setting the threshold condition for the relevance degree and the threshold condition for the appearance frequency according to the user search intent.

Specifically, the relevance degree has a larger value when the relevance between the two arbitrary words is stronger, the user search intent obtaining unit obtains a discovery mode instruction that is a search intent of the user intending to retrieve a piece of text that is unpredictable, and the related word obtaining unit obtains, as the related word, a word for which the relevance degree with respect to the search word is equal to or below the first threshold and the appearance frequency is equal to or below the second threshold, when the user search intent obtaining unit obtains the discovery mode instruction, the relevance degree being stored in the associative dictionary storage unit, and the appearance frequency being stored in the appearance frequency storage unit.

Alternatively, the relevance degree has a larger value when the relevance between the two arbitrary words is stronger, the user search intent threshold storage unit obtains a refinement mode instruction that is a user search intent indicating that the user has no time to utilize the information retrieval apparatus, and the related word obtaining unit obtains, as the related word, a word for which the relevance degree with respect to the search word is equal to or above the first threshold and the appearance frequency is equal to or below the second threshold, when the user search intent obtaining unit obtains the refinement mode instruction, the relevance degree being stored in the associative dictionary storage unit, and the appearance frequency being stored in the appearance frequency storage unit.

Preferably, in the information retrieval apparatus, time, a threshold condition for the relevance degree, and a threshold condition for the appearance frequency are further stored in the user search intent threshold unit in association with each other, the user search intent obtaining unit obtains, from the user search intent threshold storage unit, the threshold condition for the relevance degree and the threshold condition for the appearance frequency stored in association with the time, based on the time at which the search word is accepted, the related word obtaining unit obtains, as the related word, a word for which the relevance degree with respect to the search word and the appearance frequency satisfy, respectively, the threshold condition for the relevance degree and the threshold condition for the appearance frequency which are obtained by the user search intent obtaining unit, the relevance degree being stored in the associative dictionary storage unit, and the appearance frequency being stored in the appearance frequency storage unit.

Thus, it is possible to obtain the related word according to the time by setting the threshold condition for the relevance degree and the threshold condition for the appearance frequency according to the time. For example, in a time zone when the user is busy (for example, weekday morning), it is possible to obtain a related word having a large relevance degree and a small number of search results.

Preferably, the search word acceptance unit receives the search word from a terminal apparatus via a network, the user search intent obtaining unit receives the user search intent from the terminal apparatus via the network, the related word obtaining unit further transmits the obtained related word to the terminal apparatus via the network, and the retrieval unit transmits a search result to the terminal apparatus via the network.

Specifically, the information retrieval apparatus further includes a performance condition storage unit in which performance of the terminal, a threshold condition for the relevance degree, and a threshold condition for the appearance frequency are stored in association with each other, and the search word acceptance unit receives, from the terminal apparatus via the network, the search word and the performance of the terminal apparatus, and the related word obtaining unit obtains, as the related word, a word for which the relevance degree with respect to the search word and the appearance frequency satisfy, respectively, the threshold condition for the relevance degree and the threshold condition for the appearance frequency which correspond to the performance of the terminal apparatus received by the search word acceptance unit, the relevance degree being stored in the associative dictionary storage unit, the appearance frequency being stored in the appearance frequency storage unit, and the threshold condition for the relevance degree and the threshold condition for the appearance frequency being stored in the performance condition storage unit.

For example, when the display performance of the terminal apparatus is low and therefore only allows browsing only a small amount of data, it is possible to present to the user a related word having a high relevance degree and a small appearance frequency, that is, a related word which is less unpredictable and has a small number of results.

Further preferably, the related word obtaining unit includes: a word obtaining unit that obtains, from the associative dictionary storage unit, the related word relevant to the search word and the relevance degree with respect to the search word; an appearance frequency obtaining unit that obtains, from the appearance frequency storage unit, the appearance frequency for the related word obtained by the word obtaining unit; a weight calculating unit that calculates a weight value for each related word obtained by the word obtaining unit, based on the relevance degree and the appearance frequency for the related word; and the related word output unit that outputs the related word in descending order of the weight value.

This configuration allows increasing the weight value for the word having a high relevance degree with respect to the search word and a low appearance frequency, that is, the word useful for refining the search results. Accordingly, it is possible to output related words to the user in order of importance.

Note that the present invention can be realized not only as an information retrieval apparatus including such characteristic units but also as an information retrieval method that uses, as steps, such characteristic units included in the information retrieval apparatus, and also as a program that causes a computer to execute characteristic steps included in the information search method. Furthermore, it goes without saying that such a program can be distributed through a recording medium such as a Compact Disc-Read Only Memory (CD-ROM) or a communication network such as the Internet.

EFFECTS OF THE INVENTION

As is clear from the above description, the information retrieval apparatus according to the present invention can present to the user, in obtaining a related word for the search word, a related word having an appropriate number of search results and having appropriate relevance to the search result.

BRIEF DESCRIPTION OF DRAWINGS

FIG. 4 is a diagram showing an example of content stored in an associative dictionary storage unit.

FIG. 5 is a diagram showing an example of content stored in an appearance frequency storage unit.

FIG. 6 is a diagram showing an example of content stored in a user search intent threshold storage unit.

FIG. 9 is a diagram showing an example of words and IDs of pieces of text to which the words are relevant, both of which are stored in the appearance frequency storage unit.

FIG. 11 is an example of content displayed in a display unit.

FIG. 12 is an example of content displayed in the display unit.

FIG. 13 is a diagram showing an example of content displayed in the display unit.

FIG. 14 is an example of content displayed in the display unit.

FIG. 16 is a diagram showing an example of content stored in the user search intent threshold storage unit.

FIG. 19 is a diagram showing an example of content displayed in the display unit.

FIG. 21 is an example of content displayed in the display unit.

FIG. 22 is a diagram showing an example of content stored in the user search intent threshold storage unit.

FIG. 26 is a diagram showing an example of words and viewing frequencies that are stored in a word viewing frequency storage unit.

FIG. 27 is a diagram showing an example of viewing frequencies and relevance degree threshold change widths stored in a changed value storage unit.

FIG. 29 is a diagram showing an example of content stored in the user search intent threshold storage unit after change of the relevance degree threshold.

FIG. 33 is a diagram showing an example of content displayed in the display unit.

FIG. 35 is a diagram showing an example of content stored in a search condition history storage unit.

FIG. 36 is a diagram showing an example of content stored in an input tendency weight value storage unit.

FIG. 37 is a diagram showing an example of content displayed in the display unit.

NUMERICAL REFERENCES

Figure 1:
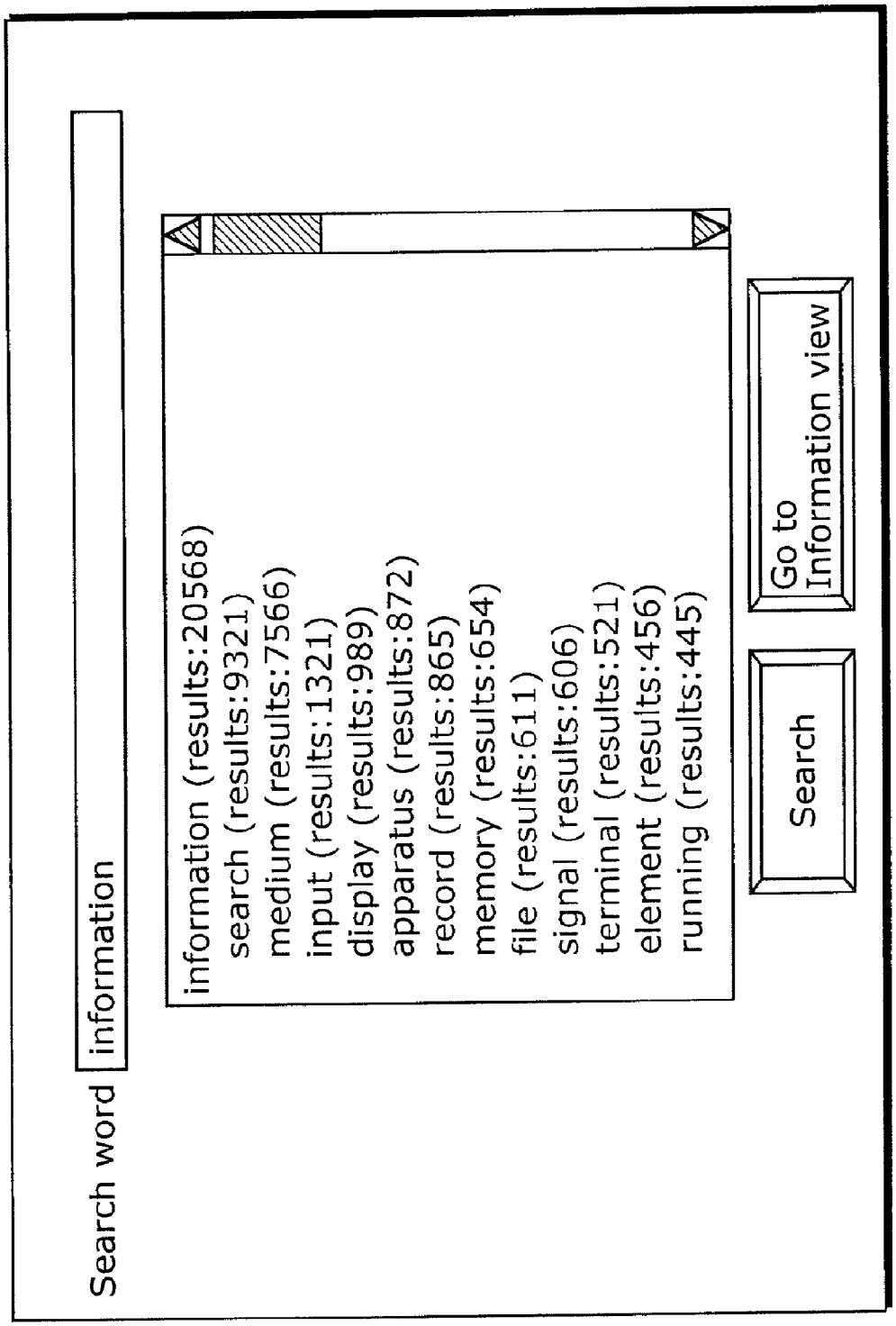
FIG. 1 is a diagram showing an example of display of a related word in a conventional apparatus.
Figure 2:
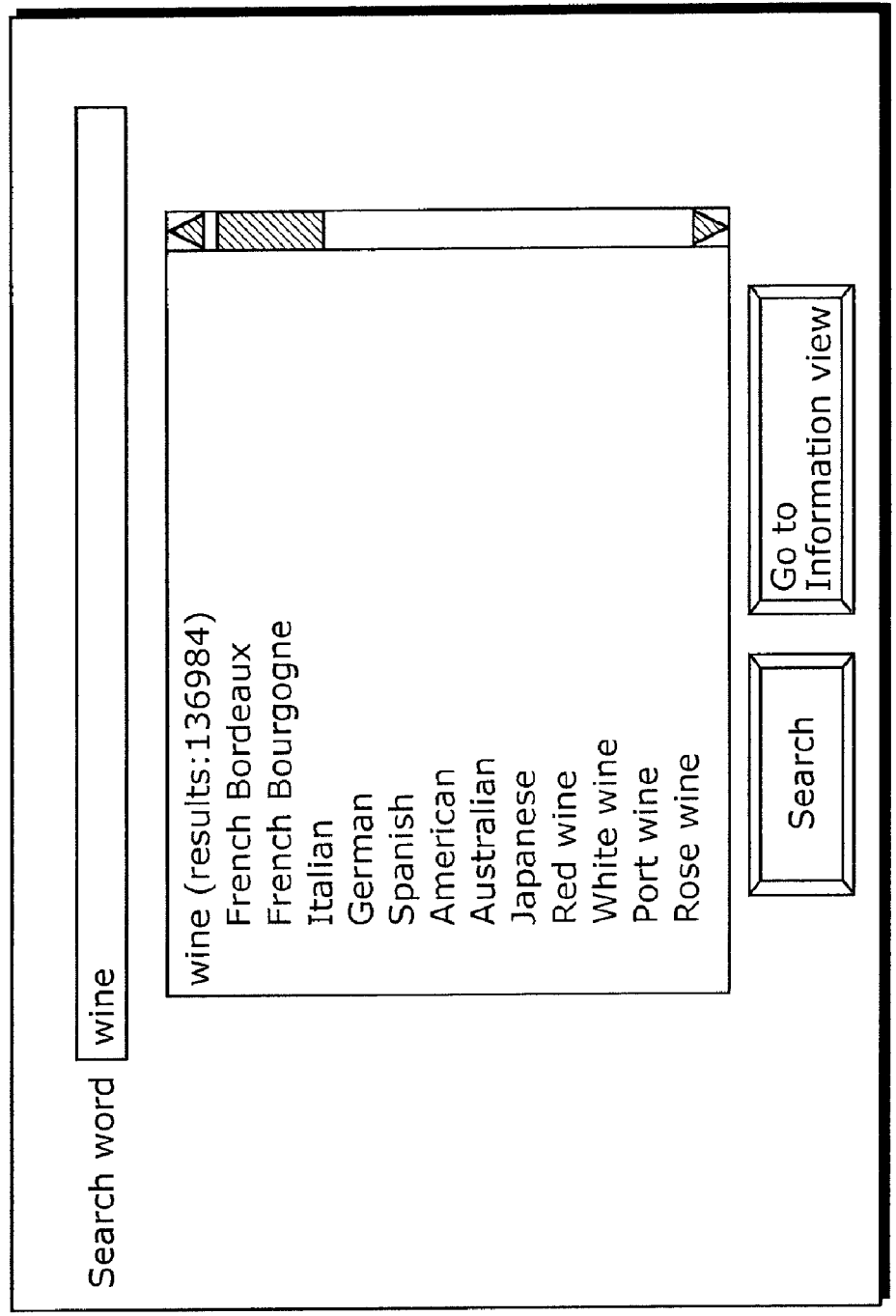
FIG. 2 is a diagram showing an example of display of a related word in a conventional apparatus.

101 Input unit
102 Related word information storage unit
102A Associative dictionary storage unit
102B Appearance frequency storage unit
103 User search intent threshold storage unit
104 Related word obtaining unit
104A User search intent obtaining unit
104B, 502 Word obtaining unit
105 Database
106 Search unit
107 Display unit
108 Specified word obtaining unit
201 Threshold updating unit
301 Communication unit
302 Receiving unit
303 Sending unit
501 Related word weight calculating unit 503 Appearance frequency obtaining unit
504, 605 Weight calculating unit
601 Word viewing frequency storage unit
601A Search condition history storage unit
602 Changed value storage unit
602A Input tendency weight value storage unit
603 Threshold condition change unit
603A Input tendency weight calculating unit
604 User search intent threshold storage unit

DETAILED DESCRIPTION OF THE INVENTION

Hereinafter, each embodiment of the present invention shall be described with reference to the drawings.

First Embodiment

Figure 3:
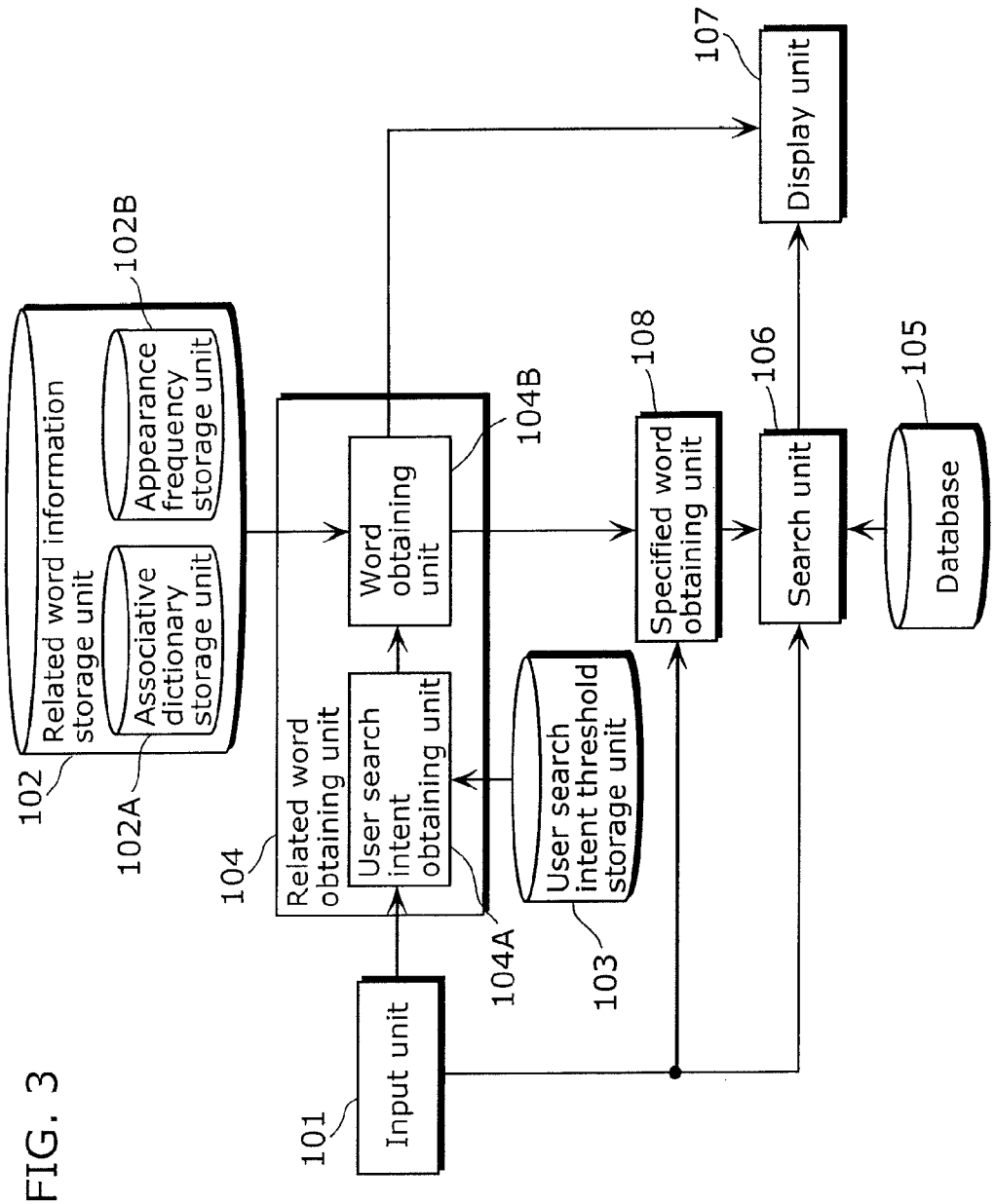
FIG. 3 is a block diagram showing a configuration of an information retrieval apparatus according to a first embodiment of the present invention.

FIG. 3 is a block diagram showing a configuration of an information retrieval apparatus according to a first embodiment of the present invention.

The information retrieval apparatus is an apparatus that retrieves, as search results, text that matches a word entered by a user as a search condition from a database in which the text to be searched is stored, and further presents to the user a related word relevant to the entered word. The information retrieval apparatus includes: an input unit 101, a related word information storage unit 102, an associative dictionary storage unit 102A, an appearance frequency storage unit 102B, a user search intent threshold storage unit 103, a related word obtaining unit 104, a user search intent obtaining unit 104A, a word obtaining unit 104B, a database 105, a search unit 106, a display unit 107, and a specified word obtaining unit 108.

The input unit 101, configured with input devices such as a keyboard, a mouse, and a remote controller, is an apparatus used by the user for entering a user search intent by using remote-controller buttons corresponding the user search intent, or for entering a search word that is a search condition, or entering to specify the related word to be displayed in the display unit 107.

In the database 105, the text to be searched is stored; for example, information regarding television broadcast programs and information regarding the content accumulated in a hard disk recorder or the like is stored therein.

The related word information storage unit 102 is a storage apparatus in which various types of information regarding the related word are stored, and includes the associative dictionary storage unit 102A and the appearance frequency storage unit 102B.

The associative dictionary storage unit 102A is a storage apparatus for storing an associative dictionary, which is information associating plural words included in the database 105 with respective relevance degrees which indicate the degrees of relevance between the plural words.

The appearance frequency storage unit 102B is a storage apparatus in which an appearance frequency, which is the number of pieces of text in which a word stored in the associative dictionary storage unit 102A appears among the text stored in the database 105, is stored in association with each word.

FIG. 4 is a diagram showing an example of an associative dictionary stored in the associative dictionary storage unit 102A. In the associative dictionary storage unit 102A, as FIG. 4 shows for example, a pair of related words that is a set of words relevant to each other (related word 1, related word 2) and the relevance degree between the pair of related words are stored in association with each other, and stored as (related word pair, relevance degree) are: ((Taro Matsushita, Jiro Matsushita), 80), ((Taro Matsushita, Hanako Matsushita), 70), ((Taro Matsushita, Saburo Matsushita), 45), ((Taro Matsushita, Shiro Matsushita), 30), ((Taro Matsushita, Goro Matsushita), 40), ((Jiro Matsushita, Saburo Matsushita), 30), ..., Note that here only personal names are stored in the associative dictionary, but common words, such as a program name, an occupational title, a country name, a geographical name, an adjective, or a genre, may also be stored in the associative dictionary.

FIG. 5 is a diagram showing an example of words and appearance frequencies stored in the appearance frequency storage unit 102B. In the appearance frequency storage unit 102B, as FIG. 5 shows for example, words and appearance frequencies are stored in association with each other, and stored as (word, appearance frequency) are: (Taro Matsushita, 50), (Jiro Matsushita, 60), (Hanako Matsushita, 20), (Saburo Matsushita, 90), (Shiro Matsushita, 15), (Goro Matsushita, 10), . . . .

The user search intent threshold storage unit 103 is a storage apparatus for storing, in association with the user search intent, the relevance degree and appearance frequency for the related word relevant to the user search intent.

FIG. 6 is a diagram showing an example of the user search intent, a relevance degree threshold, and an appearance frequency threshold which are stored in the user search intent threshold storage unit 103. In the user search intent threshold storage unit 103, as FIG. 6 shows for example, a type of remote-controller button to be entered by the user as the user search intent, a relevance degree threshold (lower limit, upper limit), and an appearance frequency threshold (upper limit, lower limit) are stored in association with each other, and stored as (remote-controller button type, relevance degree threshold, appearance frequency threshold) are: (refinement mode, (51, 100), (10, 50)), (information coverage mode, (51, 100), (51, 100)), and (discovery mode, (10, 50), (10, 50)).

Figure 7:
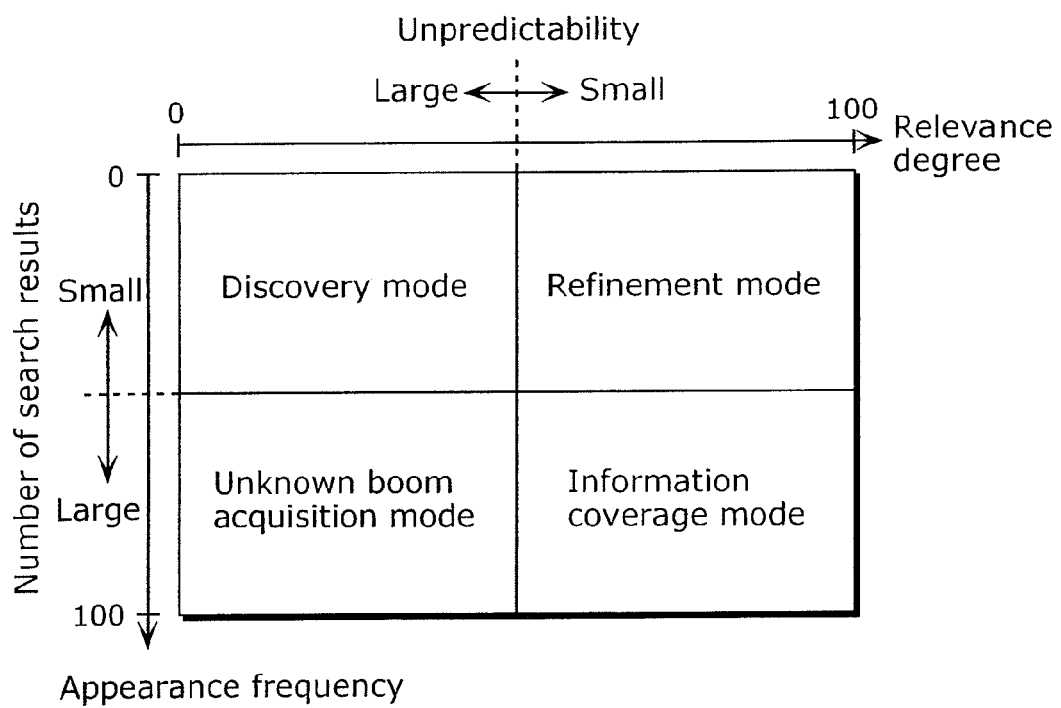
FIG. 7 is a diagram schematically showing a relationship between each mode and a relevance degree.

FIG. 7 is a diagram schematically showing a relationship to between each mode, the relevance degree, and the appearance frequency. As the figure shows, unpredictability of the related word increases as the relevance degree decreases.

Figure 8:
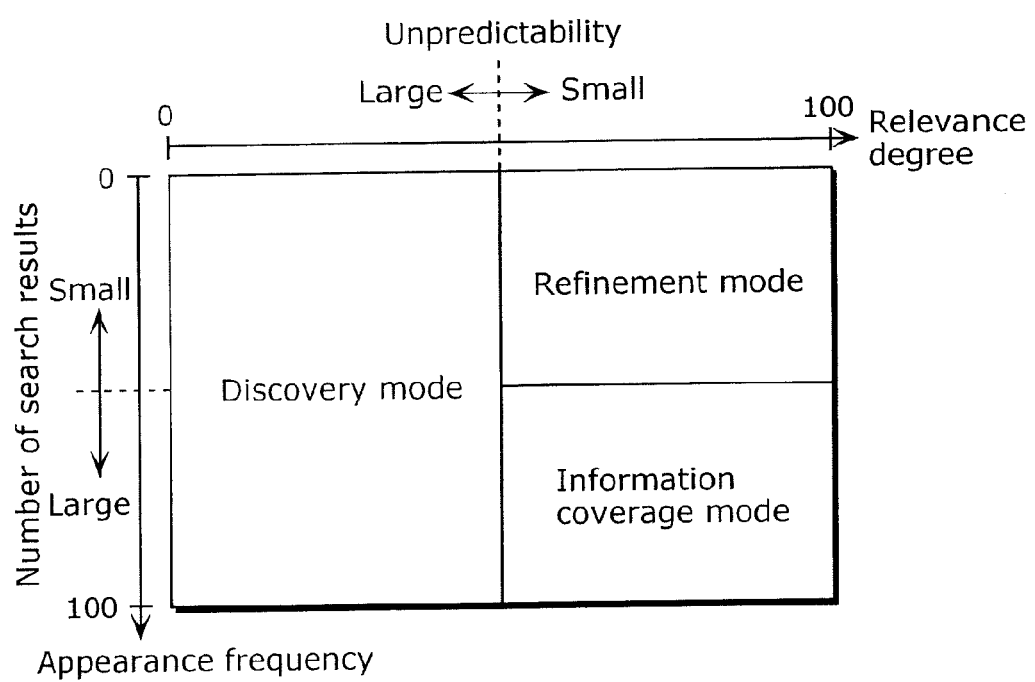
FIG. 8 is a diagram schematically showing a relationship between each mode, a relevance degree, and an appearance frequency.

Note that here the relationship between each mode, the relevance degree, and the appearance frequency is schematically shown with an example where the threshold for the appearance frequency for the discovery mode is (10, 50). However, in the discovery mode, it is possible to present, without considering the threshold for the appearance frequency, a related word which is unpredictable to the user because of having weak relevance. FIG. 8 is a diagram schematically showing the relationship between each mode, the relevance degree, and the appearance frequency in this case.

The related word obtaining unit 104 is a processing unit that obtains a related word corresponding to the user search intent, and includes a user search intent obtaining unit 104A and a word obtaining unit 104B.

The user search intent obtaining unit 104A is a processing unit that obtains from the user search intent threshold storage unit 103, thresholds for the relevance degree and the appearance frequency, which correspond to the user search intent entered from the input unit 101.

The word obtaining unit 104B is a processing unit that obtains, from the associative dictionary storage unit 102A, a related word which is relevant to a search word entered from the input unit 101 and satisfies the threshold condition for the relevance degree obtained by the user search intent obtaining unit 104A, and further obtains the appearance frequency for the related word from the appearance frequency storage unit 102B, so as to output only a related word that satisfies the threshold condition for the appearance frequency obtained by the user search intent obtaining unit 104A. Note that here the word obtaining unit 104B is assumed to obtain the appearance frequency for the related word from the appearance frequency storage unit 102B. However, as with the appearance frequency storage unit 102B shown in FIG. 9, in the case of storing a word and a text ID to which the word is relevant in association with each other, it is also applicable to set, as the appearance frequency for the related word, a value that is obtained by subtracting the number of text IDs common to the related word and the search word from the number of text IDs associated with the related word. In this manner, it is possible to assume, as the appearance frequency for the related word, the number of search results which do not overlap with the results of the search using the search word.

The search unit 106 is a processing unit that obtains, so as to output as search results, text relevant to a word that is entered from the database 105.

The display unit 107 is a processing unit that displays related words outputted from the word obtaining unit 104B and search results outputted from the search unit 106, and is configured with, for example, a display apparatus.

The specified word obtaining unit 108 is a processing unit that outputs, when given an input from the input unit 101 to specify a related word among the related words displayed in the display unit 107, the specified related word to the search unit 106.

Next, the operation of the thus-configured information retrieval apparatus according to the present embodiment shall be described.

Figure 10:
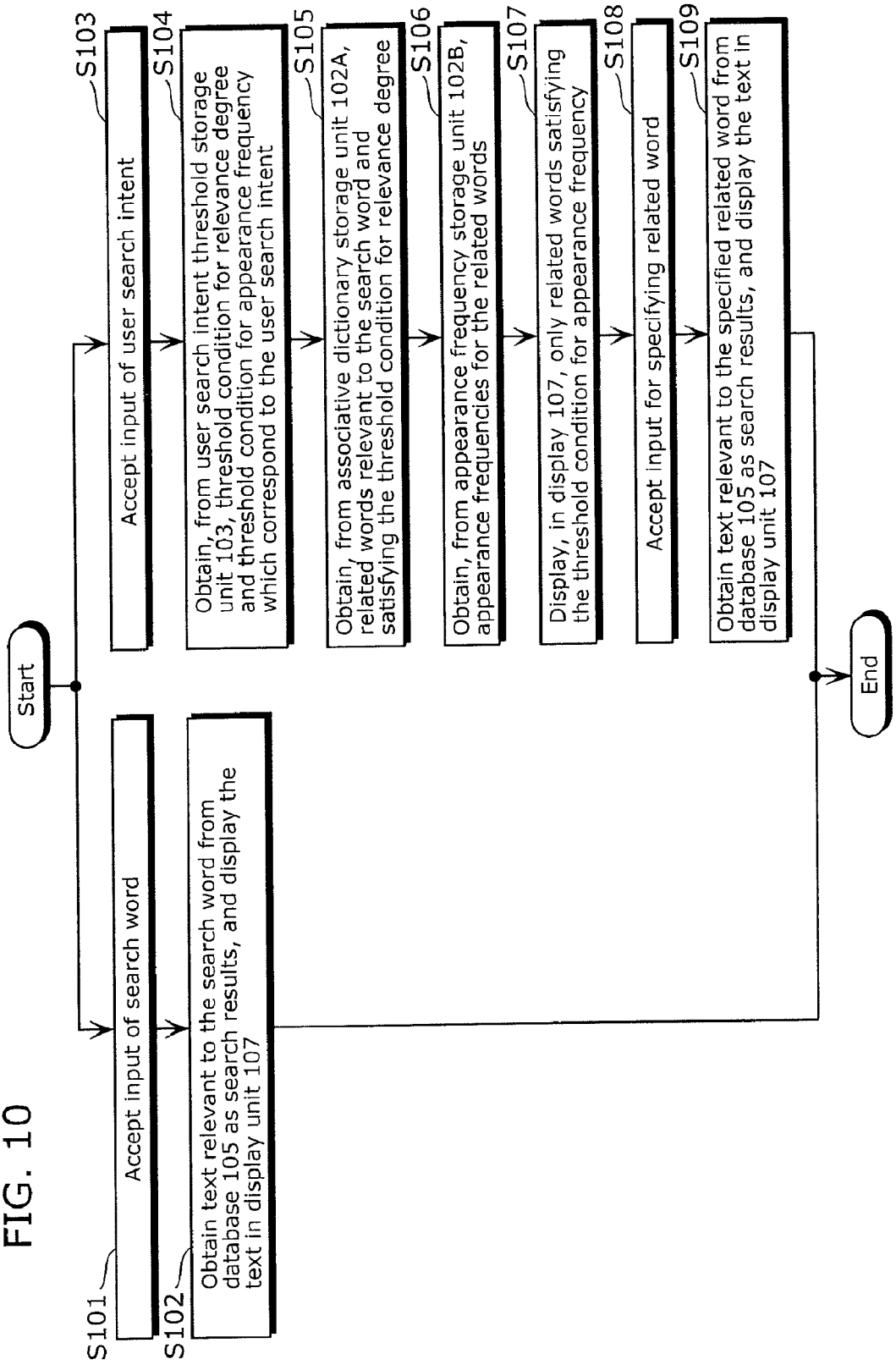
FIG. 10 is a flowchart showing an operation of the information retrieval apparatus of the first embodiment.

FIG. 10 is a flowchart showing the operation of the information retrieval apparatus.

The user enters a search word from the input unit 101 as a search condition (step S101). For a specific example, assume that the user enters a search word "Taro Matsushita" from the input unit 101.

The search unit 106 obtains from the database 105, text relevant to the search word entered from the input unit 101, and displays the obtained text in the display unit 107 (step S102). In the above example, the search unit 106 obtains, from the database 105, text relevant to the search word "Taro Matsushita" entered from the input unit 101, and displays the obtained text in the display unit 107. Here, FIG. 11 shows an example of display in the display unit 107 in which search results are displayed.

Furthermore, the user search intent is entered by the user from the input unit 101 (step S103). In the above example, each of the cases where the user enters a user search intent "refinement mode" from the input unit 101 and where the user enters a user search intent "discovery mode" shall be described.

First, when a user search intent and a search word are entered from the input unit 101, the user search intent obtaining unit 104A obtains, from the user search intent threshold storage unit 103, a relevance degree threshold and an appearance frequency threshold which correspond to the entered user search intent, and outputs, to the word obtaining unit 104B, the entered search word and the obtained thresholds for the relevance degree and the appearance frequency (step S104).

In the above example, when the user search intent entered from the input unit 101 is "refinement mode", the user search intent obtaining unit 104A obtains, from the user search intent threshold storage unit 103 shown in FIG. 6, (51, 100) as the relevance degree threshold (lower limit, upper limit), and (10, 50) as the appearance frequency threshold (lower limit, upper limit), and outputs, to the word obtaining unit 104B, these obtained relevance degree threshold (upper limit, lower limit): (51, 100) and appearance frequency threshold (lower limit, upper limit): (10, 50) along with the entered search word "Taro Matsushita".

In addition, when the user search intent "discovery mode" in the above example is entered from the input unit 101, the user search intent obtaining unit 104A obtains, from the user search intent threshold storage unit 103 shown in FIG. 6, (10, 50) as the related word threshold (lower limit, upper limit) and (10, 50) as the appearance frequency threshold (lower limit, upper limit), and outputs, to the word obtaining unit 104B, these obtained related word threshold (lower limit, upper limit): (10, 50) and appearance frequency threshold (lower limit, upper limit): (10, 50) along with the search word "Taro Matsushita".

When the search word, the relevance degree threshold, and the appearance frequency threshold are entered from the user search intent obtaining unit 104A, the word obtaining unit 104B obtains, first, from the associative dictionary storage unit 102A, a related word which is relevant to the search word and satisfies the condition of the entered relevance degree threshold (step S105). Furthermore, the word obtaining unit 104B obtains the appearance frequency for the obtained related word from the appearance frequency storage unit 102B (step S106). Then, the word obtaining unit 104B extracts only a related word satisfying the condition of the entered appearance frequency threshold, and displays the extracted related word in the display unit 107 (step S107).

In the above example, when the user search intent is "refinement mode", the word obtaining unit 104B obtains first, from the associative dictionary storage unit 102A shown in FIG. 4, related words "Jiro Matsushita" and "Hanako Matsushita" which are relevant to the search word "Taro Matsushita" and satisfy the condition of the relevance degree threshold (lower limit, upper limit): (51, 100), when the search word "Taro Matsushita", the relevance degree threshold (lower limit, upper limit): (51, 100), and the appearance frequency threshold (lower limit, upper limit): (10, 50) are entered from the user search intent obtaining unit 104A. Furthermore, the word obtaining unit 104B obtains appearance frequencies "60" and "20", respectively, for the related words "Jiro Matsushita" and "Hanako Matsushita" obtained from the appearance frequency storage unit 102B shown in FIG. 5, and extracts, to display in the display unit 107, the related word "Hanako Matsushita" having an appearance frequency that satisfies the entered appearance frequency threshold (lower limit, upper limit): (10, 50). Here, FIG. 12 shows an example of display in the display unit 107 in which the related word is displayed.

Accordingly, when the user search intent is the "refinement mode", the related word to be displayed has low unpredictability (high relevance degree) for the entered search word and appears in a small number of pieces of text (low appearance frequency) when the text stored in the database 105 is searched.

Accordingly, since the related word to be displayed has low unpredictability for the search word and is therefore intended by the user for the search, and furthermore, since the related word appears in a small number of pieces of text when the search is carried out using the related word, it is possible to reduce the time for browsing the content of the text retrieved with the related word.

In addition, when the user search intent is the "discovery mode", the related word to be displayed has high unpredictability (low relevance) for the entered search word and appears in a small number of pieces of text (low appearance frequency) when the text stored in the database 105 is searched.

Accordingly, since the related word to be displayed has high unpredictability for the search word and is therefore not assumed by the user when the user enters the search word, and furthermore, since the related word appears in a small number of pieces of text when the search is carried out using the related word, it is possible to reduce the time for browsing the content of the text retrieved with the related word.

In addition, when the user search intent is the "discovery mode", and when the search word "Taro Matsushita", the relevance degree threshold value (upper limit, lower limit): (10, 50), and the appearance frequency threshold (lower limit, upper limit): (10, 50) are entered from the user search intent obtaining unit 104A in the above example, the word obtaining unit 104B obtains, from the associative dictionary storage unit 102A shown in FIG. 4, related words "Saburo Matsushita", "Shiro Matsushita", and "Goro Matsushita" which are relevant to the search word "Taro Matsushita" and satisfy the condition of the relevance degree threshold (lower limit, upper limit): (10, 50). Furthermore, the user search intent obtaining unit 104A obtains appearance frequencies "90", "15", and "10", respectively, for the related words "Saburo Matsushita", "Shiro Matsushita", and "Goro Matsushita" obtained from the appearance frequency storage unit 102B shown in FIG. 5, and extracts, so as to display in the display unit 107, the related words "Shiro Matsushita" and "Goro Matsushita" each of which has an appearance frequency satisfying the entered appearance frequency threshold (lower limit, upper limit): (10, 50). Here, FIG. 13 shows an example of display in the display unit 107 in which the related words are displayed.

In addition, when the user search intent is "unknown boom acquisition mode", and when the search word "Taro Matsushita", the relevance degree threshold (upper limit, lower limit): (10, 50), and the appearance frequency threshold (lower limit, upper limit): (51, 100) are entered from the user search intent obtaining unit 104A in the above example, the word obtaining unit 104B obtains, from the associative dictionary storage unit 102A shown in FIG. 4, related words "Saburo Matsushita", "Shiro Matsushita", and "Goro Matsushita" which are relevant to the search word "Taro Matsushita" and satisfy the threshold condition for the relevance degree (lower limit, upper limit): (10, 50). Furthermore, the user search intent obtaining unit 104A obtains appearance frequencies "90", "15", and "10", respectively, for the related words "Saburo Matsushita", "Shiro Matsushita", and "Goro Matsushita" obtained from the appearance frequency storage unit 102B shown in FIG. 5, and extracts, so as to display in the display unit 107, the related word "Saburo Matsushita" having an appearance frequency satisfying the entered appearance frequency threshold (lower limit, upper limit): (51, 100). Accordingly, when the user search intent is the "unknown boom acquisition mode", the related word to be displayed has high unpredictability (low relevance degree) for the entered search word and appears in a large number of pieces of text (high appearance frequency) when the text stored in the database 105 is searched.

Accordingly, since the related word to be displayed has high unpredictability for the search word and is therefore not assumed by the user (unknown) when the user enters the search word, and furthermore, since the related word appears in a large number of pieces of text when the search is carried out using the related word, it is possible to browse the content of various types of text when searched with the related word. That is, the user is able to obtain a related word, which is not known to the user when the user enters the search word but is currently in fashion (having high appearance frequency).

Furthermore, an input is given by the user from the input unit 101, to specify the related word (step S108). In the above example, assume that the user has entered, from the input unit 101, a number "2" for the related word "Goro Matsushita" displayed in the display unit 107 in FIG. 13.

When given an input from the input unit 101 to specify the related word to be displayed in the display unit 107, the specified word obtaining unit 108 outputs the specified related word to the search unit 106, and the search unit 106 obtains text relevant to the related word from the database 105 when the related word is entered from the specified word obtaining unit 108, so as to display the obtained text in the display unit 107 (step S109).

In the above example, the specified word obtaining unit 108 outputs the related word "Goro Matsushita" to the search unit 106 when given, from the input unit 101, the input of the number "2" for the related word "Goro Matsushita" shown in the display unit 107 in FIG. 13, and the search unit 106 obtains text relevant to the related word "Goro Matsushita" from the database 105 when given the input of the related word from the specified word obtaining unit 108, so as to display the obtained text in the display unit 107. Here, FIG. 14 shows an example of display in the display unit 107 in which search results are displayed.

Figure 15:
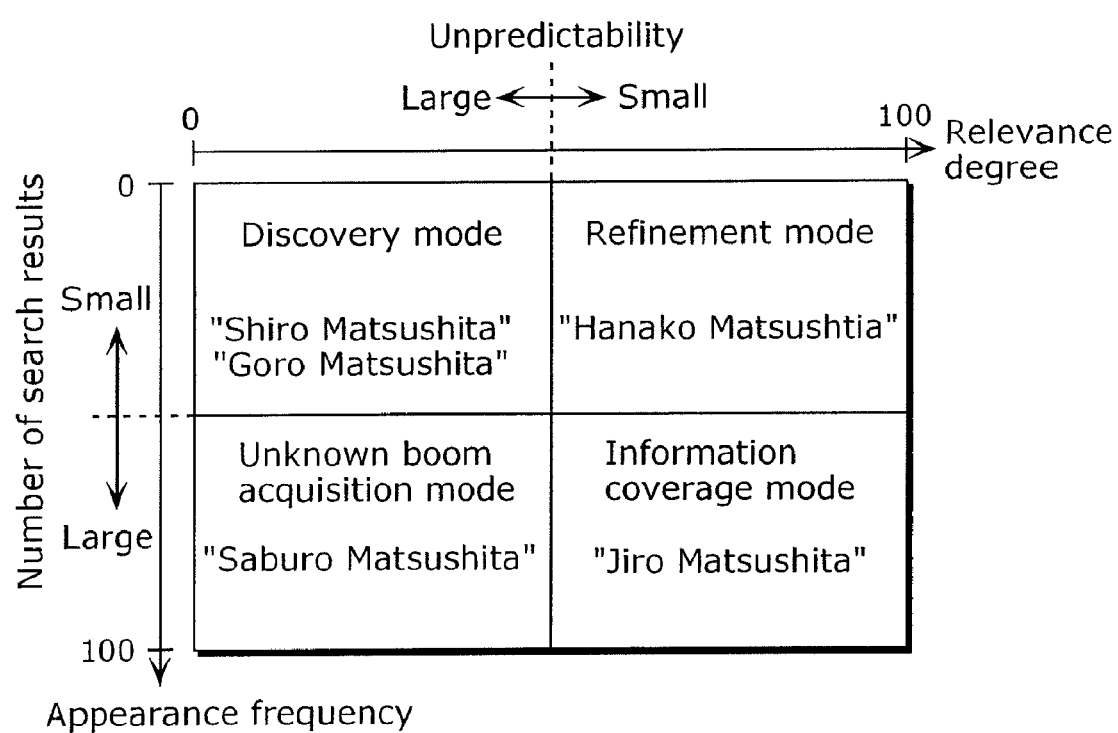
FIG. 15 is a diagram schematically showing a relationship between each mode, a relevance degree, an appearance frequency, and a related word.

In the present embodiment, only related words corresponding to the user search intent are obtained to be displayed. However, as FIG. 15 shows, the words may also be outputted onto the screen that is divided into: "discovery mode", "unknown boom acquisition mode", "information coverage mode", and "refinement mode" (hereinafter, referred to as "all the user search intents").

In this case, in the flowchart shown in FIG. 10, when the user enters the search word from the input unit 101 without entering the user search intent (step S103), relevance degree thresholds and appearance frequency thresholds corresponding to all the user search intents are obtained from the user search intent threshold storage unit 103.

Then, related words satisfying the condition of each one of all the user search intents are obtained (steps S105 to S106). Next, as shown in FIG. 15, related words satisfying the condition of all the user search intents are displayed for each user search intent (step S107).

Accordingly, this allows the user to specify the related word according to the user search intent displayed in FIG. 15. The user can thereby specify the user search intent even when the related word is already on display.

First Variation of First Embodiment

Note that in the present embodiment, the user search intent obtaining unit 104A has obtained, from the user search intent threshold storage unit 103, thresholds for the relevance degree and the appearance frequency according to the type of the remote-controller button entered from the input unit 101. However, instead of the type of the remote-controller button, a time zone or day of the week may also be stored in the user search intent threshold storage unit 103 in association with the thresholds for the relevance degree and the appearance frequency. In this case, the user search intent obtaining unit 104A may obtain the day and time at which the search word is entered from the input unit 101, so as to obtain thresholds for the relevance degree and the appearance frequency which correspond to the obtained time and day.

FIG. 16 shows an example of the user search intent threshold storage unit 103 in which days and time zones are stored in association with thresholds for the relevance degree and the appearance frequency. For example, the figure shows that:

during a period from 6 to 8 o'clock on Monday to Friday, the relevance degree threshold (lower limit, upper limit) is (51, 100) and the appearance frequency threshold (lower limit, upper limit) is (10, 50).

With such information being stored in the user search intent threshold storage unit 103, it is possible to obtain, in a time zone in which the user is busy (weekday morning, for example), a related word having a high relevance degree and a small number of search results to be obtained and therefore allowing an easy review of io the search results.

In addition, when the related word belongs to the content area that is not familiar to the user, there is a high possibility that the user can obtain unknown content. On the other hand, when enormous amounts of search results are obtained, it is difficult for the user to think of an appropriate search word allowing refinement of the content due to unfamiliarity of the content area. This requires a considerable effort to be spent on browsing a huge contents list so as to obtain the intended content. However, in a time zone in which the user is free, for example, the information retrieval apparatus can determine that the user has time to do a heuristic search for the content, and operate in such a manner as to allow the user to discover unpredictable content. That is, the information retrieval apparatus presents to the user, a related word the search results of which need not be refined for the reason that the related word belongs to a content area unpredictable or unfamiliar to the user and allows a review of the search results due to the small number of the obtained search results because the related word has a low relevance degree with respect to the search word inputted by the user, that is, belongs to a content area different from that of the search word inputted by the user. This allows the user to obtain the related word belonging to the content area different from that of the entered search word, and thereby allows an easy browse of the contents list for the obtained related word. Accordingly, the user can easily judge whether or not the content is unpredictable and desired to be browsed.

Second Variation of First Embodiment

In addition, the information retrieval apparatus in the present embodiment may further include a threshold updating unit.

Figure 17:
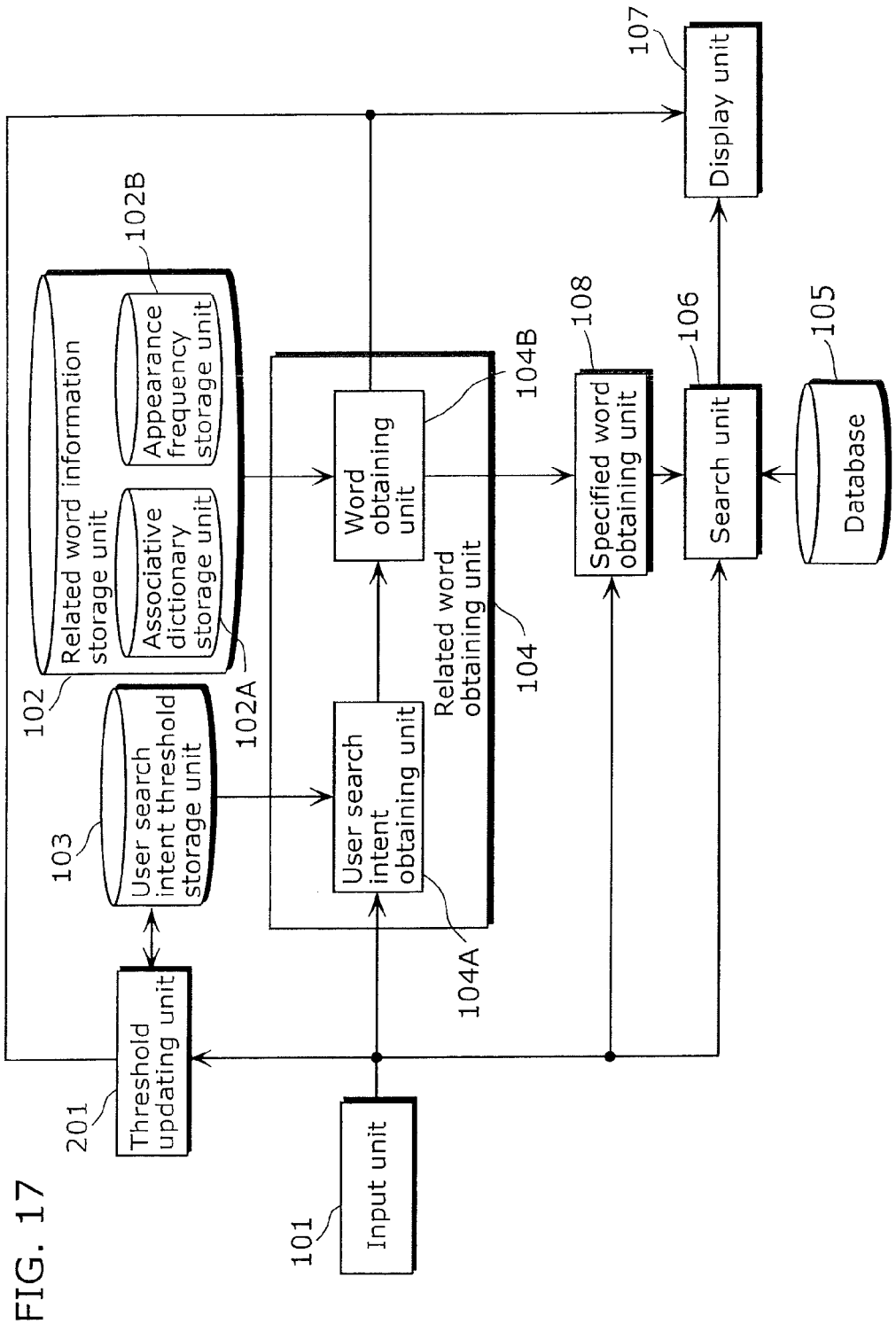
FIG. 17 is a block diagram showing a configuration of an information retrieval apparatus according to a second variation of the first embodiment of the present invention.

FIG. 17 is a block diagram showing a configuration of an information retrieval apparatus including a threshold updating unit 201.

The threshold updating unit 201 reads and displays in the display unit 107, the thresholds for the relevance degree and the appearance frequency, both of which are stored in the user search intent threshold storage unit 103. The user specifies a threshold intended to be changed and enters, from the input unit 101, a threshold after the change, with reference to the thresholds for the relevance degree and the appearance frequency displayed in the display unit 107. When the threshold that the user wants to change is specified and the changed threshold is entered from the input unit 101, the threshold updating unit 201 changes, to the changed threshold, the threshold corresponding to the threshold intended to be changed and stored in the user search intent threshold storage unit 103. Here, the user specifies the threshold intended to be changed and enters the changed threshold through a screen interface displayed in the display unit 107.

Figure 18:
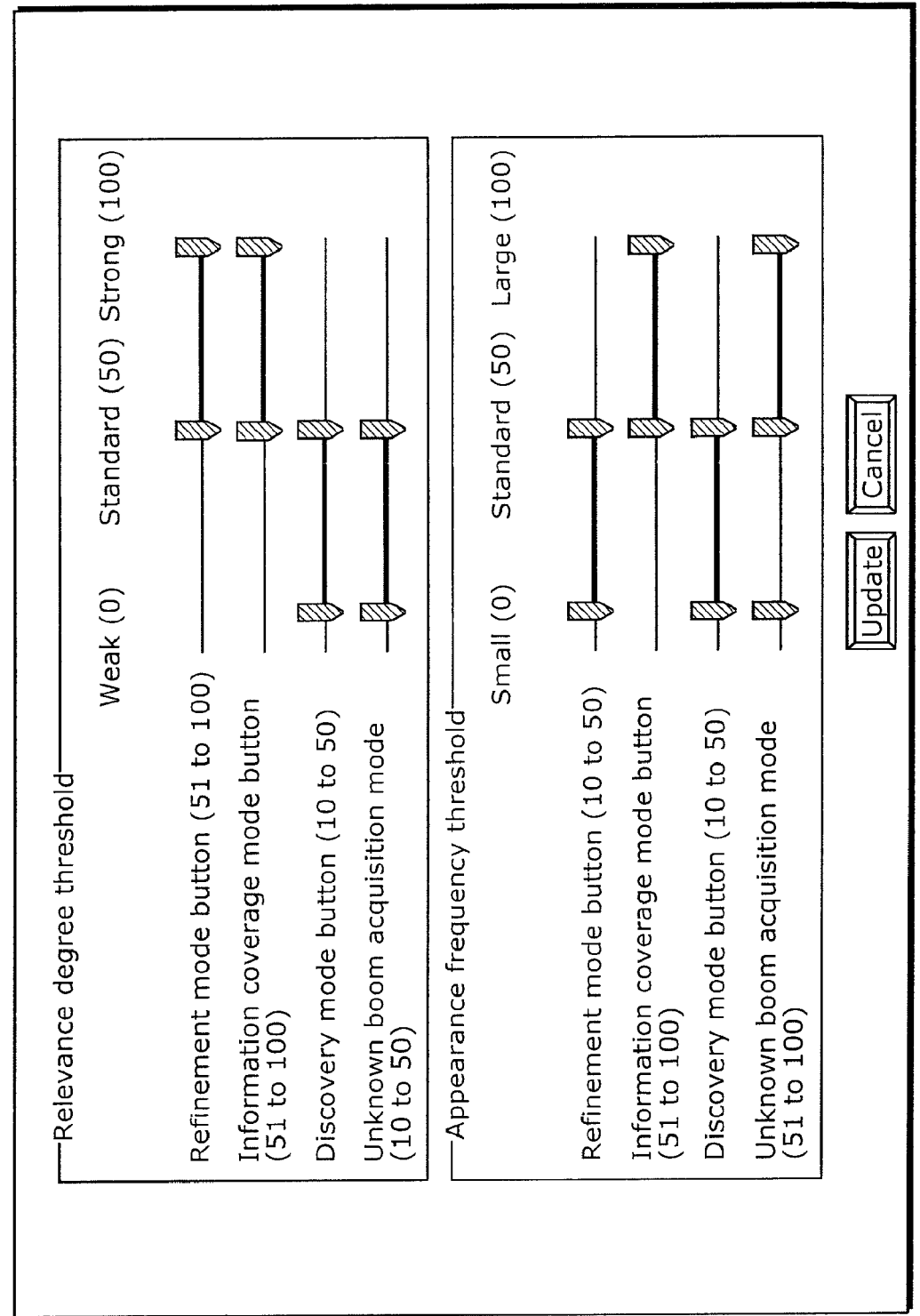
FIG. 18 is an example of content displayed in the display unit.

FIGS. 18 and 19 show an example of the screen interface displayed in the display unit 107.

With the screen interface shown in FIG. 18, it is possible to change the thresholds for the relevance degree and the appearance frequency stored in the user search intent threshold storage unit 103 by moving, from side to side, a slider corresponding to each of the thresholds for the relevance degree and the appearance frequency and provided at each of the remote-controller buttons and then pressing an update button.

With the screen interface shown in FIG. 19, it is possible to change the thresholds for the relevance degree and the appearance frequency stored in the user search intent threshold storage unit 103 by the user entering numerical values from the keyboard and then pressing an update button.

Figure 20:
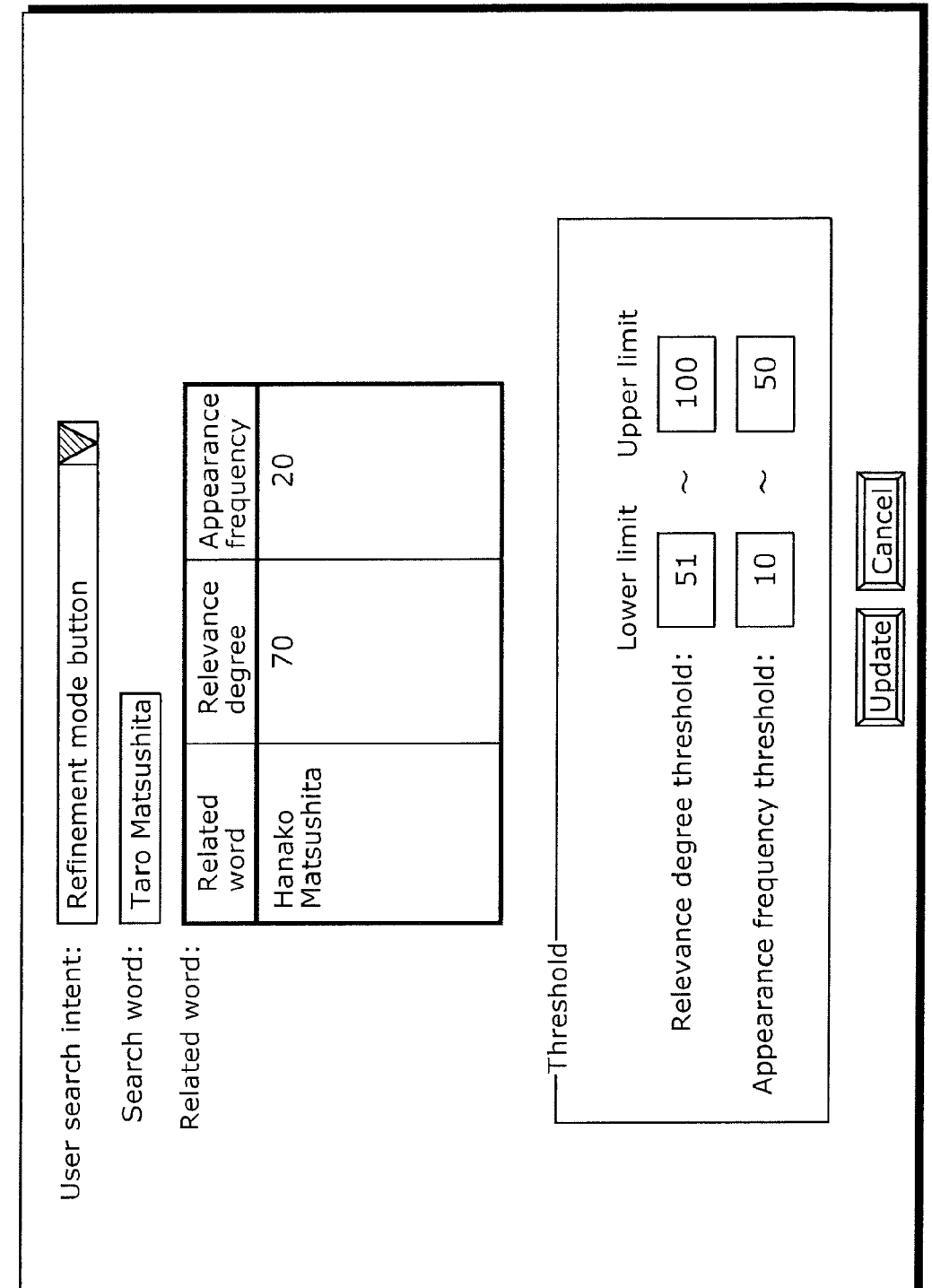
FIG. 20 is a diagram showing an example of content displayed in the display unit.

Note that the display unit 107 may obtain from the related word information storage unit 102 and display, a related word which is relevant to a specific word and satisfies the thresholds for the relevance degree and the appearance frequency stored in the user search intent threshold storage unit 103, and the specific word may further be selected from among words included in the associative dictionary storage unit 102A or be entered by the user. FIG. 20 shows an example of a screen displayed in the display unit 107 before the user selects the "refinement mode button" as the user search intent and changes the thresholds for the relevance degree and the appearance frequency. On the screen, a related word for a search word "Taro Matsushita" is displayed along with thresholds for the relevance degree and the appearance frequency corresponding to the user search intent "refinement mode button". FIG. 21 is an example of a screen displayed in the display unit 107 after the thresholds for the relevance degree and the appearance frequency are changed by the user. FIG. 22 shows the content of the user search intent threshold storage unit 103 after the threshold change. By performing such processing, the user can recognize the change of the related word as a result of the change in the thresholds for the relevance degree and the appearance frequency and thus can easily set thresholds that allow obtainment of a related word matching the preference of the user.

Third Variation of First Embodiment

In addition, in the present embodiment, the user search intent, the search word, and the related word are entered to be specified from the input unit 101, and the search results for the text relevant to the search word, the related word, and the search results for the text relevant to the related word are displayed in the display unit 107. However, the information retrieval apparatus may be connected to a user terminal via a network.

Figure 23:
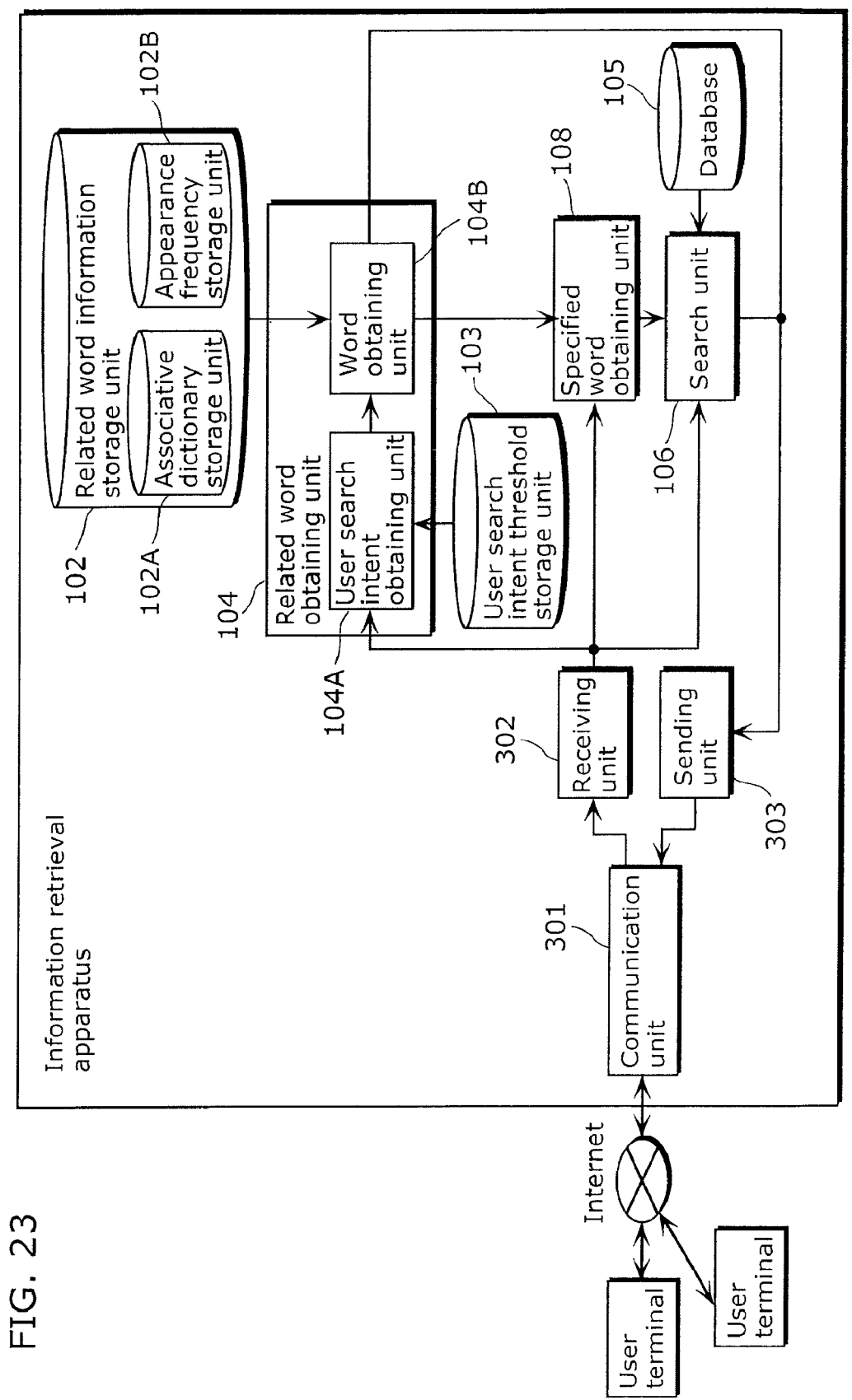
FIG. 23 is a block diagram showing a configuration of an information retrieval apparatus according to a third variation of the first embodiment of the present invention.

FIG. 23 is a block diagram showing a configuration of such an information retrieval apparatus.

The information retrieval apparatus includes a receiving unit 302 instead of the input unit 101 shown in FIG. 3, and a sending unit 303 instead of the display unit 107. Furthermore, the information retrieval apparatus includes a communication unit 301 that communicates with the user terminal via the network.

The receiving unit 302 is a processing unit that receives the user search intent, the search word, and the specified related word from the user terminal via the communication unit 301.

The sending unit 303 is a processing unit that transmits to the user terminal, via the communication unit 301, the search results for the text relevant to the search word, the related word, and the search results for the text relevant to the related word.

With the configuration as described above, the user is able to send the user search intent and the search word from the user terminal to the information retrieval apparatus that is provided on the Internet, so as to obtain the related word matching the user search intent, and to search for the content using the obtained related word.

Figure 24:
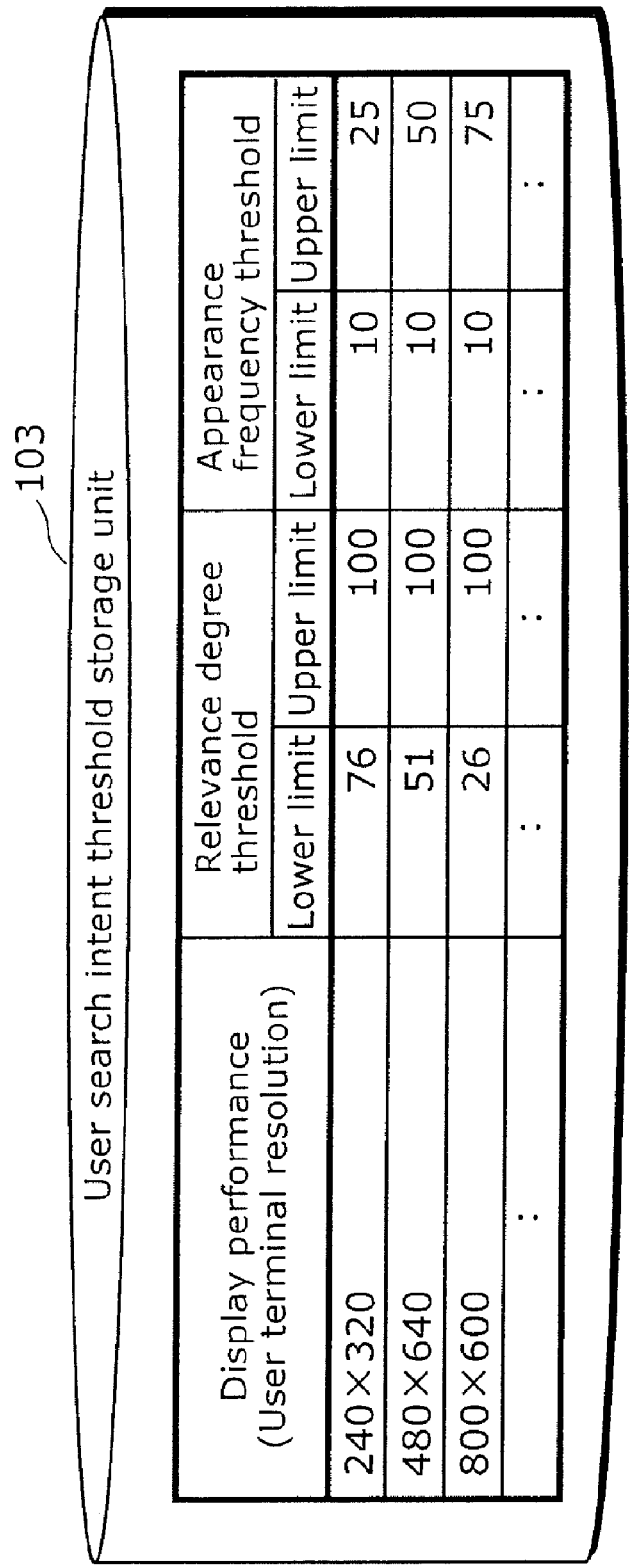
FIG. 24 is a diagram showing an example of content stored in the user search intent threshold storage unit.

Note that the display performance or the name of the user terminal may be stored as the user search intent stored in the user search intent threshold storage unit 103. In this case, when the display performance or the name of the user terminal is entered from the receiving unit 302, the user search intent obtaining unit 104A obtains thresholds for the relevance degree and the appearance frequency corresponding to the display performance or user terminal name that is entered. FIG. 24 shows an example of the user search intent threshold storage unit 103 in which the resolution of the user terminal as the display performance and the thresholds for the relevance degree and the appearance frequency are stored in association with each other. With the configuration as above, for example, when the display performance of the user terminal is low and allows browsing of only a small amount of content at a time, it is possible to present a related word that allows searching only the content that has strong relevance because of the high relevance degree with respect to the search word, and allows presenting a content group which need not be further refined by the user because of the low appearance frequency. In addition, when the display performance of the user terminal is high and allows browsing of a large amount of content at a time, the user is able to search the content without omission, by presenting to the user related words ranging from those having standard relevance to the search word, to those having weak relevance, to those having strong relevance. At the same time, since this user terminal allows browsing of the large amount of content at a time, it is possible to further search the content by also including related words having a standard-to-high appearance frequency.

As described above, according to the present variation, it is possible to present related words to the user in consideration of the display performance of the user terminal.

Fourth Variation of First Embodiment

In addition, in the present embodiment, the information retrieval apparatus may further include a word viewing frequency storage unit 601, a changed value storage unit 602, and a threshold condition change unit 603.

Figure 25:
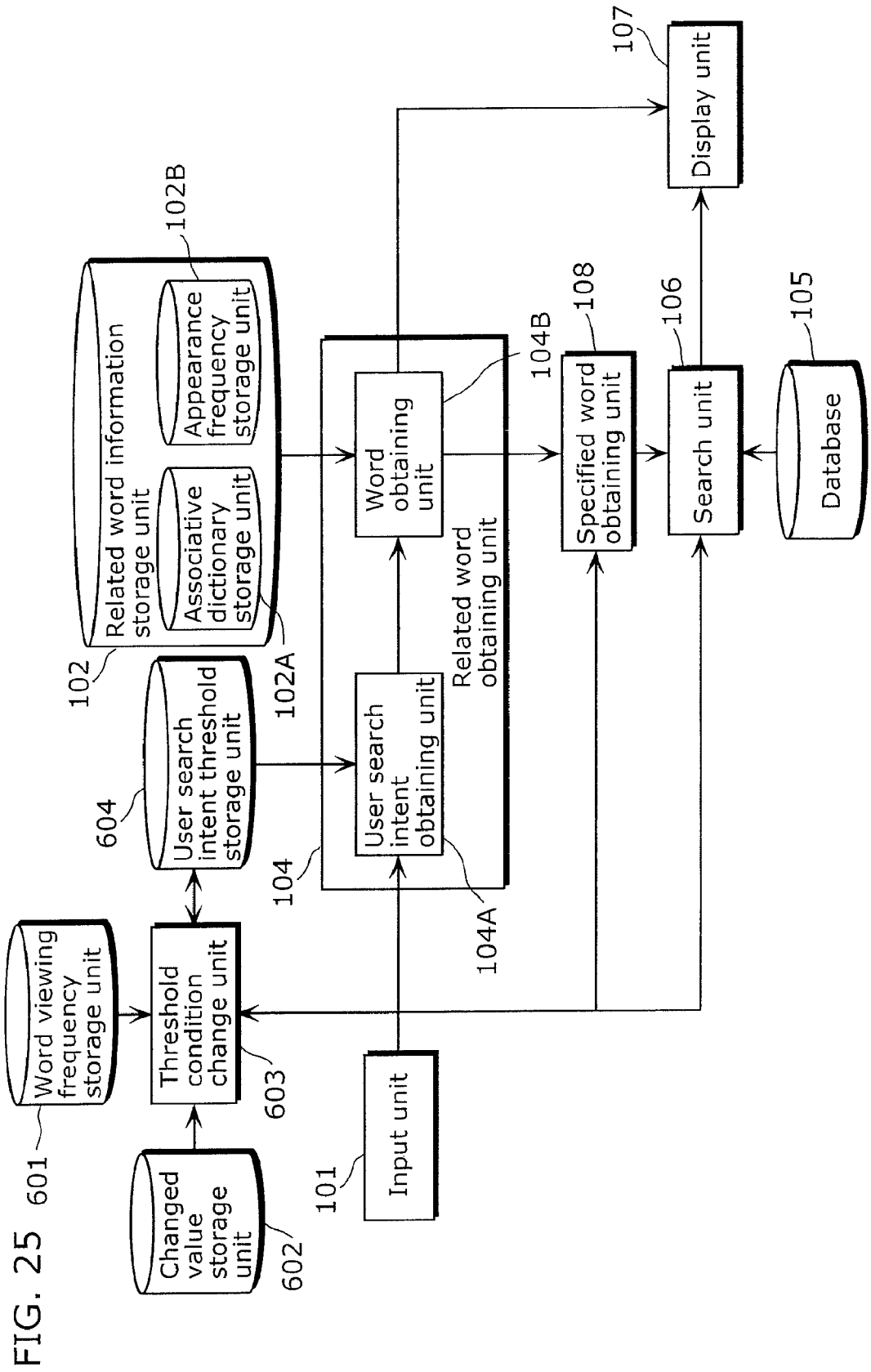
FIG. 25 is a block diagram showing a configuration of an information retrieval apparatus according to a fourth variation of the first embodiment of the present invention.

FIG. 25 is a block diagram showing a configuration of an information retrieval apparatus including the word viewing frequency storage unit 601, the changed value storage unit 602, the threshold condition change unit 603, and the user search intent threshold storage unit 604.

In the word viewing frequency storage unit 601, words included in the database 105 are stored in association with viewing frequency information, which is information regarding the frequency with which the word appears in explanatory information for a program viewed by the user.

In the changed value storage unit 602, a word viewing frequency and a change width for the relevance degree threshold are stored in association with each other.

When the search word is entered from the input unit 101, the threshold condition change unit 603 obtains, from the word viewing frequency storage unit 601, viewing frequency information corresponding to the search word, so as to obtain, from the changed value storage unit 602, a change width for the threshold corresponding to the obtained viewing frequency information, changes, based on the change width, the relevance degree threshold in the initial threshold condition stored in the user search intent threshold storage unit 103, and stores, as the changed threshold condition, the changed relevance degree threshold and the appearance frequency in the initial threshold condition into the user search intent threshold storage unit 604. In the user search intent threshold storage unit 604, the thresholds for the relevance degree and the appearance frequency which are stored in the user search intent threshold storage unit 103 (hereinafter, referred to as an "initial threshold condition") and the threshold condition for the relevance degree changed by the threshold condition change unit 603 and the appearance frequency (hereinafter, referred to as a "changed threshold condition") are stored.

FIG. 26 is a diagram showing an example of words and viewing frequencies stored in the word viewing frequency storage unit 601. In the word viewing frequency storage unit 601, as FIG. 26 shows for example, words and viewing frequencies are stored in association with each other, and stored as (word, viewing frequency) are: (Taro Matsushita, 10), (Jiro Matsushita, 10), (Hanako Matsushita, 2), (Saburo Matsushita, 2), (Shiro Matsushita, 5), (Goro Matsushita, 0), . . . . Here, (Taro Matsushita, 10), for example, indicates that the user has viewed 10 times, a television broadcast program having program explanatory information in which the word "Taro Matsushita" is described.

FIG. 27 is a diagram showing an example of viewing frequencies and the threshold change widths for the relevance degree stored in the changed value storage unit 602. In the changed value storage unit 602, as FIG. 27 shows for example, viewing frequencies and the threshold change widths for the relevance degree are stored in association with each other, and stored as (viewing frequency, threshold change width) are: (0 to below 5, +10), (5 to below 10, 0), and (10 and above, −10). Here, for example, (0 to below 5, +10) indicates that: where viewing frequency is "from 0 to below 5", a value 10 is added to the relevance degree threshold (the lower limit of the relevance degree threshold in the refinement mode and the information coverage mode, and the upper limit of the relevance degree threshold in the discovery mode).

Figure 28:
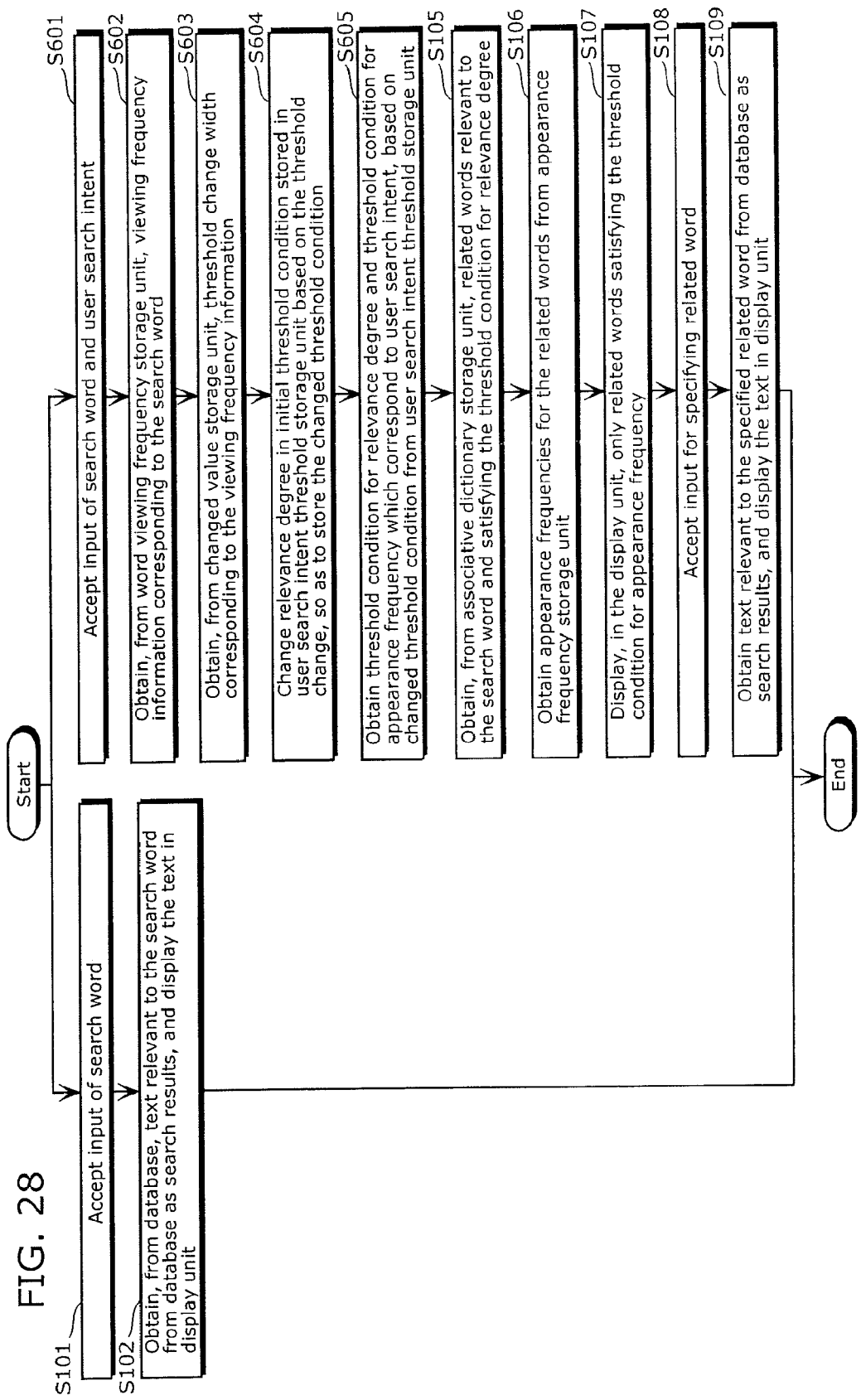
FIG. 28 is a flowchart showing an operation of the information retrieval apparatus according to the fourth variation of the first embodiment of the present invention.

FIG. 28 is a flowchart showing the operation of the information retrieval apparatus. Steps S101 to 5102, and steps S104 to S109 are the same as in the first embodiment, and therefore the detailed description thereof shall be omitted.

The user enters a search word and a user search intent from the input unit 101 as a search condition (step S601). For a specific example, assume that the user enters a search word "Taro Matsushita" and a user search intent "refinement mode" from the input unit 101.

When the search word and the user search intent are entered from the input unit 101, the threshold condition change unit 603 obtains, first, from the word viewing frequency storage unit 601, viewing frequency information corresponding to the search word (step S602). In the above example, the viewing frequency information "10" corresponding to the search word "Taro Matsushita" is obtained from the word viewing frequency storage unit 601.

Furthermore, the threshold condition change unit 603 obtains, from the changed value storage unit 602, a threshold change width corresponding to the obtained viewing frequency information (step S603). In the above example, the threshold condition change unit 603 obtains, from the changed value storage unit 602, a threshold change width "−10" corresponding to the obtained viewing frequency information "10".

Then, the threshold condition change unit 603 changes, based on the obtained threshold change width, the relevance degree threshold in the initial threshold condition stored in the user search intent threshold storage unit 604, and stores, in the user search intent threshold storage unit 604 as the changed threshold condition, the changed relevance degree threshold and the appearance frequency in the initial threshold condition (step S604). In the above example, based on the threshold change width "−10", "10" is subtracted from the lower limit of the relevance degree threshold in the refinement mode and the information coverage mode, and from the upper limit of the relevance degree threshold in the discovery mode. FIG. 6 shows an example of the user search intent threshold storage unit 103 before change, and FIG. 29 shows an example of the user search intent threshold storage unit 604 after change.

The user search intent obtaining unit 104A obtains, from the changed threshold condition stored in the user search intent threshold storage unit 604, the relevance degree threshold and the appearance frequency threshold which correspond to the entered user intent, and outputs, to the word obtaining unit 104B, the entered search word and the obtained thresholds for the relevance degree and the appearance frequency (step S605). In the above example, the relevance degree threshold (lower limit, upper limit); (41, 100) and the appearance frequency threshold (lower limit, upper limit): (10, 50) which correspond to the user search intent "refinement mode" entered from the input unit 101 are obtained from the changed threshold condition stored in the user search intent threshold storage unit 604, and these obtained thresholds for the relevance degree and the appearance frequency and the entered search word "Taro Matsushita" are outputted to the word obtaining unit 104B.

The operation in the subsequent steps from S105 to 5109 is the same as in the first embodiment, and therefore the detailed description thereof shall be omitted.

As described above, considering that a related word having strong relevance to the search word has a high relevance degree because it appears in the same program, and a related word having weak relevance to the search word has a low relevance degree because it appears in another program, it is highly possible that the user already knows that: a high viewing frequency for the search word entered by the user indicates a more frequent appearance of the related word in the same program as the search word than in the case of low viewing frequency, even if the reference degree is the same. In this case, the relevance degree threshold that serves as a criterion for unpredictability for the user should be lower than the relevance degree threshold for the search word having a low viewing frequency. According to the present variation, it is possible to decrease the relevance degree threshold which serves as a criterion for unpredictability for the user when the viewing frequency for the search word is high, and to increase the relevance degree threshold when the viewing frequency for the search word is low.

As described above, according to the present embodiment, the user search intent, the relevance degree threshold, and the appearance frequency threshold are recorded in association with each other, and such thresholds for the relevance degree and the appearance frequency are changed according to the user search intent, so as to obtain a related word satisfying the changed thresholds for the relevance degree and the appearance frequency. This allows presenting to the user, a related word matching the user search intent.

Second Embodiment

Figure 30:
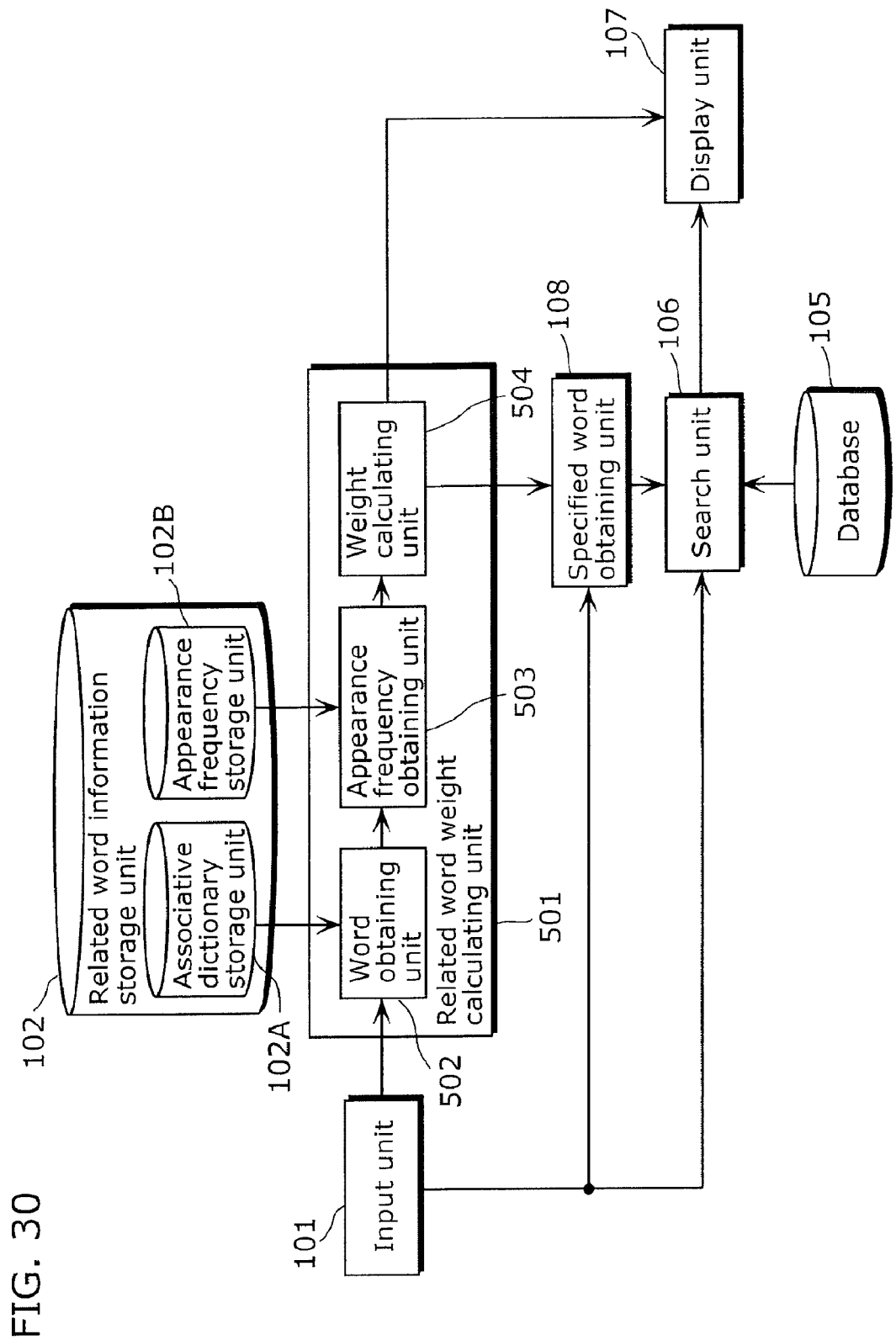
FIG. 30 is a block diagram showing a configuration of an information retrieval apparatus according to a second embodiment of the present invention.

FIG. 30 is a block diagram showing a configuration of an information retrieval apparatus according to a second embodiment of the present invention.

The same portions as in the first embodiment are appended with the same numerals, and the detailed description thereof shall be omitted.

The information retrieval apparatus of the present embodiment is an apparatus that performs weighting on the related word relevant to the search word by using the relevance degree and the appearance frequency, to thereby present the related word to the user in accordance with the weight, and the information retrieval apparatus includes: an input unit 101, a related word information storage unit 102, an associative dictionary storage unit 102A, an appearance frequency storage unit 102B, a database 105, a search unit 106, a display unit 107, a specified word obtaining unit 108, a related word weight calculating unit 501, a word obtaining unit 502, an appearance frequency obtaining unit 503, and a weight calculating unit 504.

The related word weight calculating unit 501 is a processing unit that outputs a related word relevant to the search word, and includes the word obtaining unit 502, the appearance frequency obtaining unit 503, and the weight calculating unit 504.

The word obtaining unit 502 is a processing unit that obtains, from the associative dictionary storage unit 102A, a related word relevant to the search word and a relevance degree with respect to the search word when the search word is entered from the input unit 101.

The appearance frequency obtaining unit 503 is a processing unit that obtains, from the appearance frequency storage unit 102B, an appearance frequency for the related word obtained by the word obtaining unit 502.

The related word weight calculating unit 501 includes a weight calculating unit 504, which calculates, using the relevance degree obtained by the word obtaining unit 502 and the appearance frequency obtained by the appearance frequency obtaining unit 503, a weight value which increases as the relevance degree increases and as the appearance frequency decreases (as information specificity increases) for the related word obtained by the word obtaining unit 502, and outputs a related word having a weight value equal to or above a specific threshold.

Next, the operation of the thus-configured information retrieval apparatus according to the present embodiment shall be described.

Figure 31:
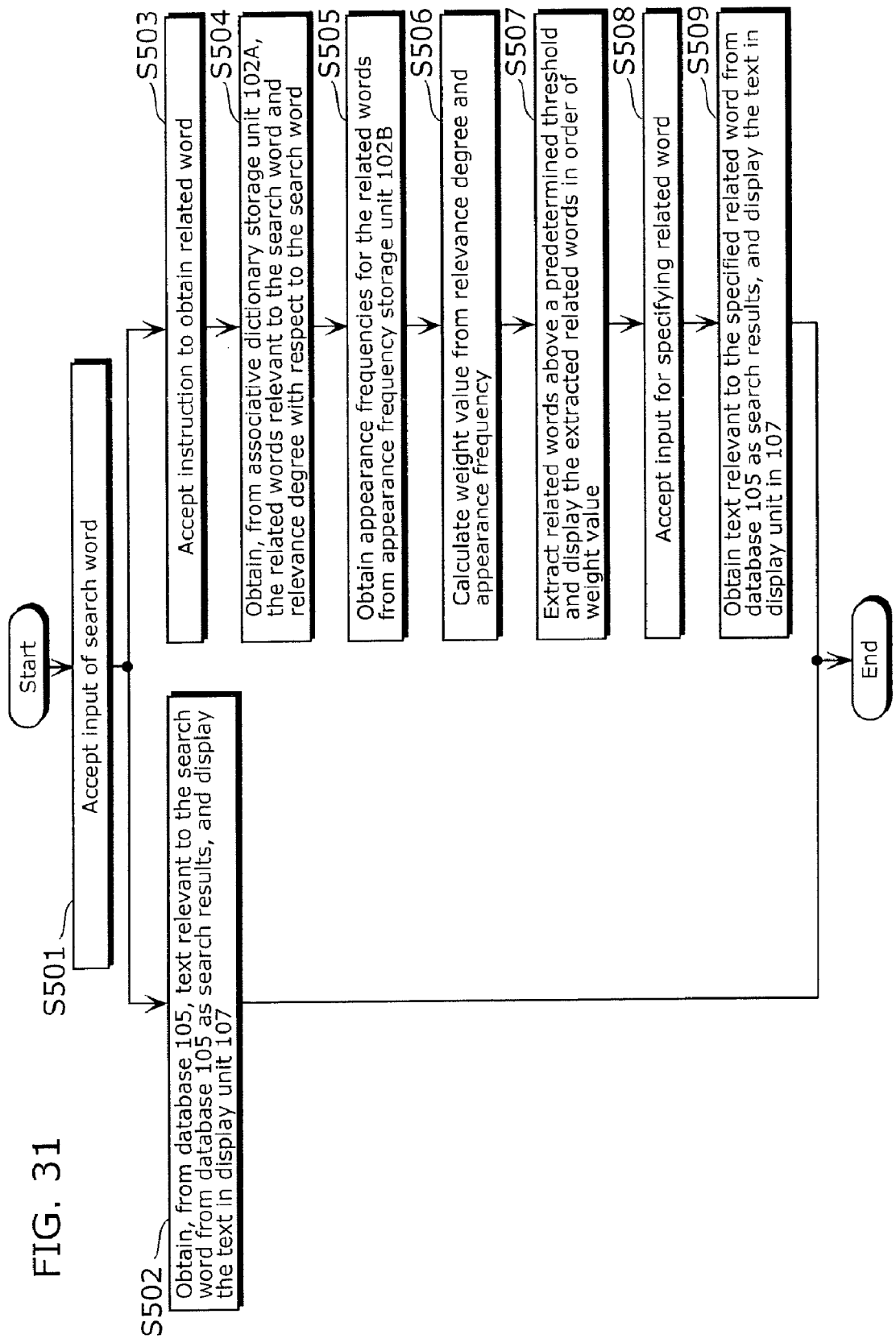
FIG. 31 is a flowchart showing an operation of the information retrieval apparatus of the second embodiment.

FIG. 31 is a flowchart showing the operation of the information retrieval apparatus.

The operation in steps from S501 to S502 is the same as the operation in steps from S101 to S102, and therefore the description thereof shall be omitted.

When the search word and a related word obtainment instruction are entered from the input unit 101 (step S503), the word obtaining unit 502 obtains, from the associative dictionary storage unit 102A, a related word relevant to the search word and a relevance degree with respect to the search word (step S504). As a specific example, assume that the user enters, from the input unit 101, a search word "Taro Matsushita" and the related word obtainment instruction. When the search word "Taro Matsushita" and the related word obtainment instruction are entered from the input unit 101, the word obtaining unit 502 obtains, from the associative dictionary storage unit 102A, related words "Jiro Matsushita", "Hanako Matsushita", "Saburo Matsushita", "Shiro Matsushita", and "Goro Matsushita" relevant to the search word "Taro Matsushita", and relevance degrees "80", "70", "45", "30", and "40" for the related words, respectively.

The appearance frequency obtaining unit 503 obtains, from the appearance frequency storage unit 102B, an appearance frequency for the related word obtained by the word obtaining unit 502 (step S505). In the above example, the appearance frequency obtaining unit 503 obtains, from the appearance frequency storage unit 102B, appearance frequencies "60", "20", "90", "15" and "10", respectively, for the related words obtained by the word obtaining unit 502: "Jiro Matsushita", "Hanako Matsushita", "Saburo Matsushita", "Shiro Matsushita", and "Goro Matsushita".

The weight calculating unit 504 calculates a weight value for the related word obtained by the word obtaining unit 502, using the relevance degree obtained by the word obtaining unit 502 and the appearance frequency obtained by the appearance frequency obtaining unit 503 (step S506), and extracts related words having weight values equal to or above a predetermined threshold, so as to display the related words in order of the weight value (step S507). For example, the weight value is calculated by: ((weight value)=(relevance degree)×(100−(appearance frequency))/100). Here, (100−(appearance frequency)) indicates that: assuming that the maximum value for the appearance frequency is 100, the difference between the maximum value for the appearance value and the appearance value is calculated such that the weight value increases as the appearance frequency decreases (as information specificity increases). Here, dividing the obtained value by 100 is not a requisite but is just for consistency, for the sake of explanation, with the number of digits for the relevance degree and the appearance frequency.

Figure 32:
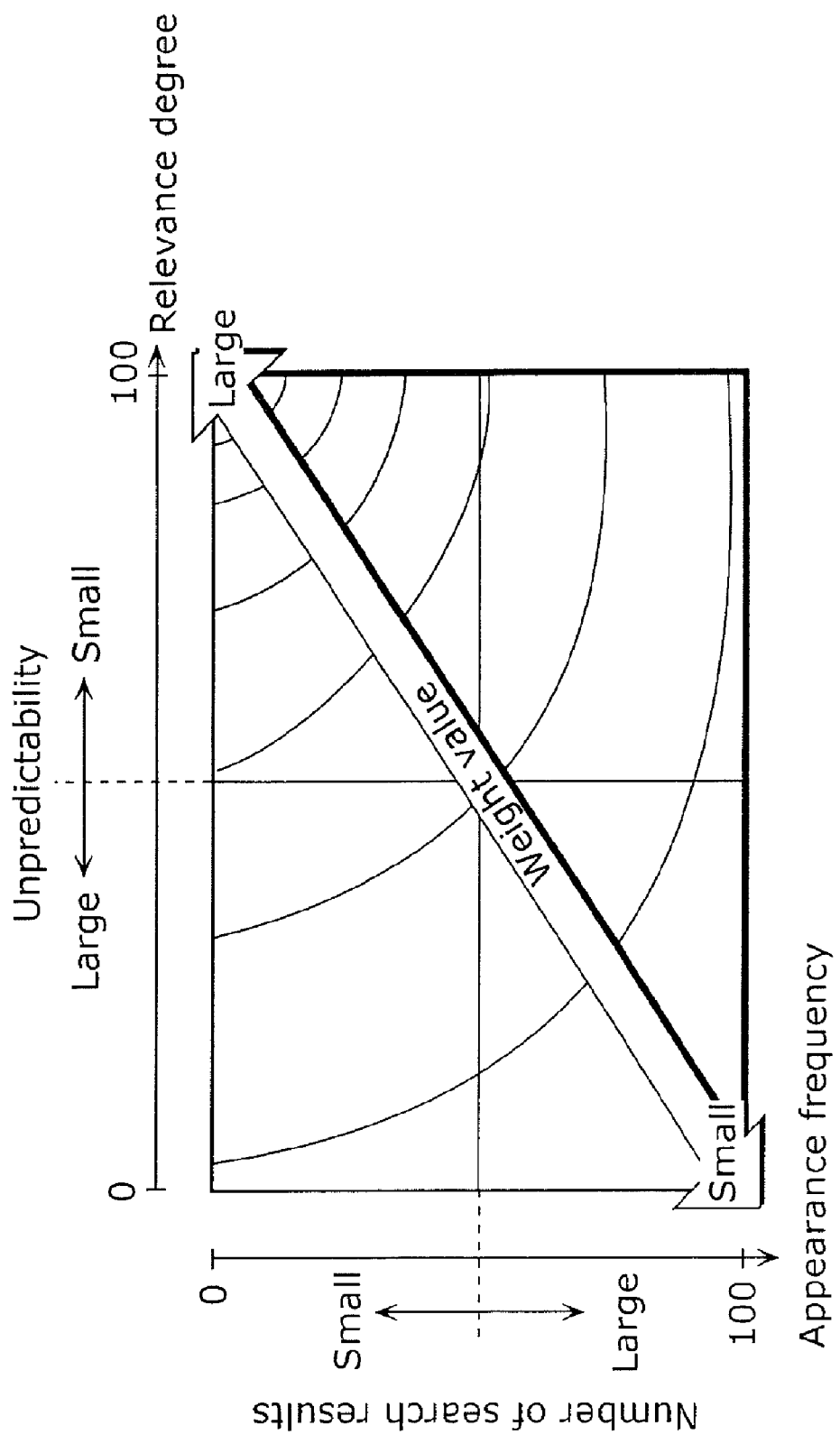
FIG. 32 is a diagram schematically showing a relationship between a weight value, a relevance degree, and an appearance frequency.

FIG. 32 is a diagram schematically showing a relationship between the weight value, the relevance degree, and the appearance frequency. The weight value increases as the relevance degree increases, and as the appearance frequency decreases. Reversely, the weight value decreases as the relevance degree decreases, and as the frequency appearance increases.

In the above example, the weight calculating unit 504 calculates weight values "32", "56", "4.5", "25.5", and "36" for the related words "Jiro Matsushita", "Hanako Matsushita", "Saburo Matsushita", "Shiro Matsushita", and "Goro Matsushita" which are obtained by the word obtaining unit 502, using relevance degrees "80", "70", "45", "30", and "40" which are obtained by the word obtaining unit 502 and appearance frequencies "60", "20", "90", "15", and "10" which are obtained by the appearance frequency obtaining unit 503. Then, the weight calculating unit 504 extracts related words "Jiro Matsushita", "Hanako Matsushita", "Shiro Matsushita", and "Goro Matsushita" having weight values equal to or above a predetermined threshold (which is set to 10, for example). The weight calculating unit 504 rearranges the extracted related words in order of the weight value, and displays "Hanako Matsushita", "Goro Matsushita", "Jiro Matsushita", and "Shiro Matsushita" in the display unit 107. Here, FIG. 33 shows an example of display in the display unit 107 in which the related words are displayed. In addition, here, the related words are displayed in the display unit 107 in descending order of the weight value, but the related words may be displayed in the display unit 107 in ascending order of the weight value. This allows a display of related words, starting from a word unpredictable and heuristic to the user.

The subsequent operation in steps from S508 to S509 is the same as in the first embodiment, and therefore the detailed description thereof shall be omitted.

First Variation of Second Embodiment

Note that the present embodiment assumes that the appearance frequency stored in the appearance frequency storage unit 102B is the number of pieces of text in which a given word appears, among the text stored in the database 105, but it is also applicable to classify a word into a word type (personal name, genre, program name, region/country, occupational title, and so on), and to determine, as appearance frequency, the ratio of the number of the pieces of text in which each of words belonging the same word type that the word belongs to appears to the total number of pieces of text in which the words belonging to the word type appear. In some cases, even a word, which appears in a small number of pieces of text and thus is judged as having a small ratio to the total number of words and allowing further refinement (important because of its specificity), has a large value in terms of the ratio to the total number of pieces of text when the total number of pieces of text in which the word belonging to the word type appears is small. By following the method described above, such a word can be judged as not important but as a general word for the word type, by taking the ratio with respect to the word type into consideration.

Second Variation of Second Embodiment

Figure 34:
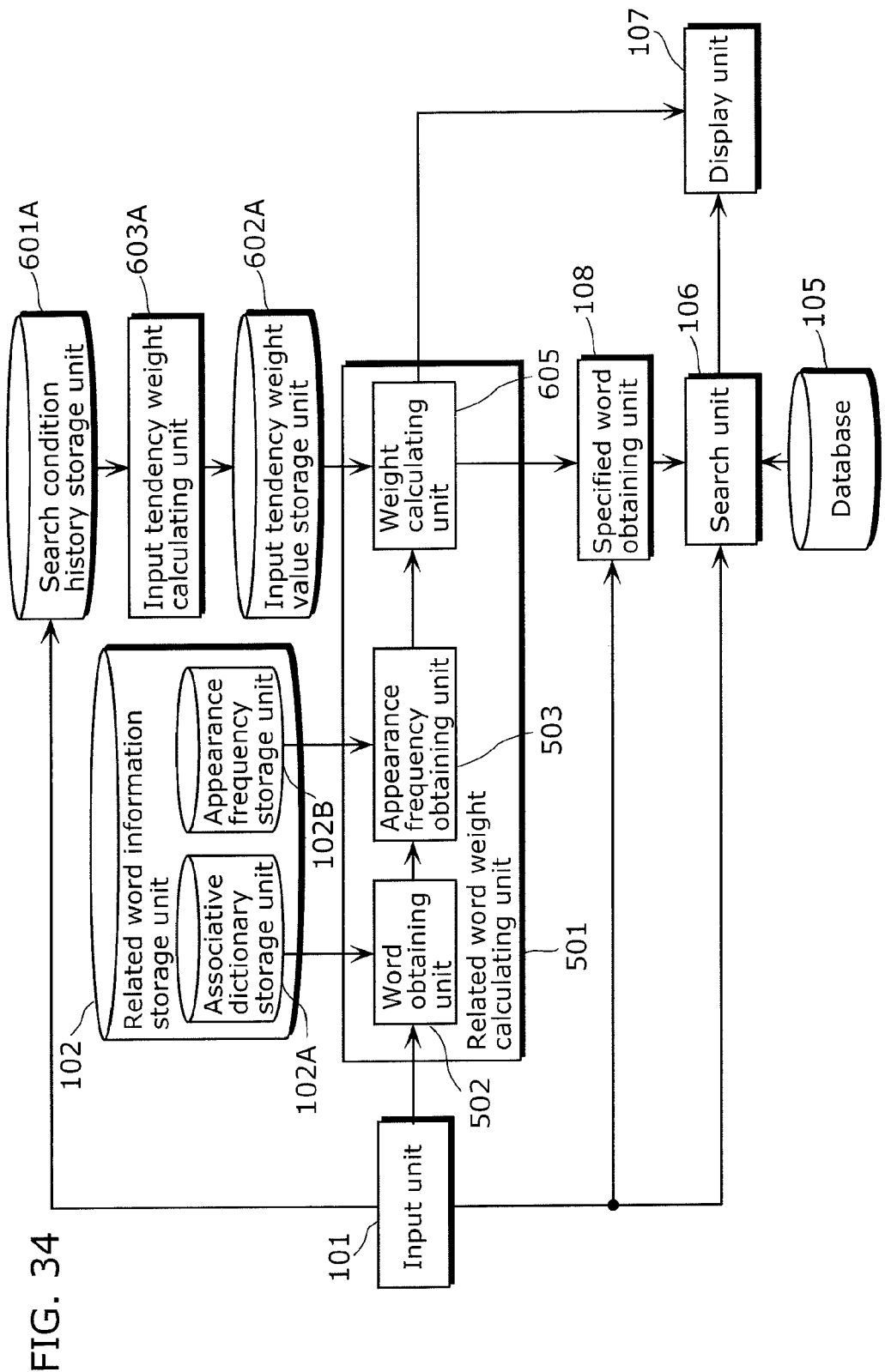
FIG. 34 is a block diagram showing a configuration of an information retrieval apparatus according to a second variation of the second embodiment of the present invention.

In addition, as FIG. 34 shows, the information retrieval apparatus according to the present embodiment may further include a search condition history storage unit 601A, an input tendency weight value storage unit 602A, and an input tendency weight calculating unit 603A.

FIG. 34 is a block diagram showing a configuration of the information retrieval apparatus.

The search condition history storage unit 601A is a storage apparatus in which a search word entered by the user from the input unit 101 is stored in association with the type of the search word (personal name, genre, program name, region/country, occupational title, and so on).

The input tendency weight value storage unit 602A is a storage unit for storing an input frequency ratio with respect to each word type.

The input tendency weight calculating unit 603A is a processing unit which calculates the ratio of words of each type to the total number of the search words stored in the search condition history storage unit 601A, and in which the word type and the ratio into the input tendency weight value storage unit 602A are stored in association with each other.

When calculating the weight value of the related word obtained by the word obtaining unit 502 by using the relevance degree obtained by the word obtaining unit 502 and the appearance frequency obtained by the appearance frequency obtaining unit 503, the weight calculating unit 605 further obtains a weight value corresponding to the type of the related word from the input tendency weight value storage unit 602A, and calculates a weight value for the related word by taking the obtained weight value into consideration.

Here, FIG. 35 shows an example of the content stored in the search condition history storage unit 601A in which the search word entered by the user and the type of the search word are stored in association with each other.

In addition, FIG. 36 shows an example of the content of the input tendency weight value storage unit 602A in which the ratio with respect to the word type, which is calculated by the input tendency weight calculating unit 603A, is stored.

Note that all the search words having been entered by the user so far are stored in the search condition history storage unit 601A, but only search words entered by the user for several times from the beginning of a search until the obtainment of satisfactory search results may also be stored in the search condition history storage unit 601A, thus allowing adaptability to the short-term input tendency of the user.

At this time, the weight calculating unit 605 calculates the weight values for the related words "Jiro Matsushita", "variety", "announcer", and "Japan" as "30", "50", "40", and "10", respectively, by using the relevance degree obtained by the word obtaining unit 502 and the appearance frequency obtained by the appearance frequency obtaining unit 503. The weight calculating unit 605 obtains, from the input tendency weight value storage unit 602A, ratios "0.3", "0.3", "0.1", and "0.1" corresponding to the related word types "personal name", "genre", "occupational title", and "region/country", respectively, and calculates "9", "15", "4", and "1", each of which is a product of the weight value that is already calculated and the ratio corresponding to the word type. The weight calculating unit 605 extracts related words "Jiro Matsushita" and "variety" having weight values equal to or above a predetermined threshold (which is set to 5, for example), rearranges the extracted related words in order of the weight value, and displays the related words in the display unit 107 in order of "variety" and "Jiro Matsushita". Here, FIG. 37 shows an example of display in the display unit 107 in which the related words are displayed.

This allows presenting related words to the user at a ratio approximated to the input ratio for the type of the search word usually entered by the user. As a result, the user can obtain more related words of the type matching the preference.

As described above, according to the present embodiment, it is possible to display, at the top in the order of presentation to the user, a word having a high relevance degree with respect to the search word entered by the user and a low appearance frequency, that is, a word useful for refining the content, by increasing the weight value for the word. This enables the user to sequentially obtain words which are strongly relevant to the entered search word and important for identifying the content.

Thus far, the information retrieval apparatus according to the first and the second embodiments of the present invention has been described, but the present invention is not limited to these embodiments.

For example, the database 105 need not necessarily be provided inside the information retrieval apparatus, but may also be connected to the information retrieval apparatus via the network.

The embodiments disclosed herein should not be considered as limitative but should be considered as illustrative in all aspects. The scope of the present invention is shown not by the above description but by the claims, and is intended to include all alterations and modifications within a sense and a scope equal to those of the claims.

INDUSTRIAL APPLICABILITY

The information retrieval apparatus according to the present invention can present to a user a related word matching a search intent of the user when the user obtains a related word relevant to a search word entered by the user as a search condition, and is applicable to a hard disk recorder, a DVD recorder, a television, a music center, a terminal apparatus that retrieves information by accessing the Internet, an information retrieval server that allows retrieval of information on the Internet, and so on.

The invention claimed is:

1. An information retrieval apparatus that retrieves a piece of text from plural pieces of text to be searched, said information retrieval apparatus comprising:
a memory;
an associative dictionary storage unit that stores, using the memory, (i) two arbitrary words from among words included in the plural pieces of text to be searched and (ii) a relevance degree indicating a strength of relevance between the two arbitrary words and having a larger value when the relevance between the two arbitrary words is stronger, wherein the two arbitrary words and the relevance degree are stored in association with each other;
an appearance frequency storage unit that stores (i) a word from among the words stored in said associative dictionary storage unit and (ii) an appearance frequency indicating a number of pieces of text, from among the plural pieces of text to be searched, in which the word appears, wherein the word and the appearance frequency are stored in association with each other;
a search word acceptance unit configured to accept a search word;
a user search intent obtaining unit configured to obtain a user search intent that indicates a search intent of a user;
a user search intent threshold storage unit that stores (i) an unknown boom acquisition mode corresponding to a search intent of the user intending to retrieve a piece of text including a word that is unpredictable with respect to the search word and currently in fashion, (ii) an unknown boom acquisition mode relevance degree threshold condition that a relevance degree is equal to or below an unpredictability threshold, and (iii) an unknown boom acquisition mode appearance frequency threshold condition that an appearance frequency is equal to or above a frequency threshold, wherein the unknown boom acquisition mode, the unknown boom acquisition mode relevance degree threshold condition, and the unknown boom acquisition mode appearance frequency threshold condition are stored in association with each other;
a related word obtaining unit configured to obtain, as a related word relevant to the search word, a first target word having (i) a relevance degree with respect to the search word that satisfies the unknown boom acquisition mode relevance degree threshold condition that the relevance degree is equal to or below the unpredictability threshold and (ii) an appearance frequency that satisfies the unknown boom acquisition mode appearance frequency threshold condition that the appearance frequency is equal to or above the frequency threshold, when said user search intent obtaining unit obtains the unknown boom acquisition mode, wherein the relevance degree for the first target word is stored in said associative dictionary storage unit and the appearance frequency for the first target word is stored in said appearance frequency storage unit; and
a retrieval unit configured to retrieve a piece of text including the search word or the related word from the plural pieces of text to be searched.

2. The information retrieval apparatus according to claim 1,
wherein said user search intent threshold storage unit stores (i) a discovery mode corresponding to a search intent of the user intending to retrieve a piece of text that is unpredictable, (ii) a discovery mode relevance degree threshold condition that a relevance degree is equal to or below the unpredictability threshold, and (iii) a discovery mode appearance frequency threshold condition that an appearance frequency is equal to or below the frequency threshold,
wherein said user search intent threshold storage unit stores the discovery mode, the discovery mode relevance degree threshold condition, and the discovery mode appearance frequency threshold condition in association with each other,
wherein said related word obtaining unit is configured to obtain, as the related word relevant to the search word, a second target word having (i) a relevance degree with respect to the search word that satisfies the discovery mode relevance degree threshold condition that the relevance degree is equal to or below the unpredictability threshold and (ii) an appearance frequency that satisfies the discovery mode appearance frequency threshold condition that the appearance frequency is equal to or below the frequency threshold, when said user search intent obtaining unit obtains the discovery mode, and wherein the relevance degree for the second target word is stored in said associative dictionary storage unit and the appearance frequency for the second target word is stored in said appearance frequency storage unit.

3. The information retrieval apparatus according to claim 1, wherein said user search intent threshold storage unit stores (i) a refinement mode corresponding to a user search intent indicating that the user has no time to utilize said information retrieval apparatus, (ii) a refinement mode relevance degree threshold condition that a relevance degree is equal to or above the unpredictability threshold, and (iii) a refinement mode appearance frequency threshold condition that an appearance frequency is equal to or below the frequency threshold, wherein said user search intent threshold storage unit stores the refinement mode, the refinement mode relevance degree threshold condition, and the refinement mode appearance frequency threshold condition in association with each other, wherein said related word obtaining unit is configured to obtain, as the related word relevant to the search word, a second target word having (i) a relevance degree with respect to the search word that satisfies the refinement mode relevance degree threshold condition that the relevance degree is equal to or above the unpredictability threshold and (ii) an appearance frequency that satisfies the refinement mode appearance frequency threshold condition that the appearance frequency is equal to or above the frequency threshold, when said user search intent obtaining unit obtains the refinement mode, and wherein the relevance degree for the second target word is stored in said associative dictionary storage unit and the appearance frequency for the second target word is stored in said appearance frequency storage unit.

4. The information retrieval apparatus according to claim 1, wherein said user search intent threshold storage unit stores (i) a time, (ii) a time relevance degree threshold condition for a relevance degree, and (iii) a time appearance frequency degree threshold condition for an appearance frequency, wherein said user search intent threshold storage unit stores the time, the time relevance degree threshold condition, and the time appearance frequency threshold condition in association with each other, wherein said user search intent obtaining unit is configured to obtain, from said user search intent threshold storage unit, the time relevance degree threshold condition for the relevance degree and the time appearance frequency threshold condition for the appearance frequency stored in association with the time, based on a time at which the search word is accepted, wherein said related word obtaining unit is configured to obtain, as the related word relevant to the search word, a second target word having (i) a relevance degree with respect to the search word that satisfies the time relevance degree threshold condition and (ii) an appearance frequency that satisfies the time appearance frequency threshold condition, and wherein the relevance degree for the second target word is stored in said associative dictionary storage unit and the appearance frequency for the second target word is stored in said appearance frequency storage unit.

5. The information retrieval apparatus according to claim 1, further comprising:

a threshold condition acceptance unit configured to accept an input of (i) an input relevance degree threshold condition for a relevance degree and (ii) an input appearance frequency threshold condition for an appearance frequency; and a threshold updating unit configured to update threshold conditions by (i) replacing the unknown boom acquisition mode relevance degree threshold condition for the relevance degree with the input relevance degree threshold condition for the relevance degree and (ii) replacing the unknown boom acquisition mode appearance frequency threshold condition for the appearance frequency with the input appearance frequency threshold condition for the appearance frequency.

6. The information retrieval apparatus according to claim 1, wherein said search word acceptance unit is configured to receive the search word from a terminal apparatus via a network, wherein said user search intent obtaining unit is configured to receive the user search intent from the terminal apparatus via the network, wherein said related word obtaining unit is further configured to transmit the obtained related word to the terminal apparatus via the network, and wherein said retrieval unit is further configured to transmit a search result to the terminal apparatus via the network.

7. The information retrieval apparatus according to claim 6, further comprising a performance condition storage unit that stores (i) a performance of the terminal apparatus, (ii) a performance relevance degree threshold condition for a relevance degree, and (iii) a performance appearance frequency threshold condition for an appearance frequency, wherein said performance condition storage unit stores the performance of the terminal apparatus, the performance relevance degree threshold condition for the relevance degree, and the performance appearance frequency threshold for the appearance frequency in association with each other, wherein said search word acceptance unit is configured to receive, from the terminal apparatus via the network, the search word and the performance of the terminal apparatus, wherein said related word obtaining unit is configured to obtain, as the related word relevant to the search word, a second target word having (i) a relevance degree with respect to the search word that satisfies the performance relevance degree threshold condition and (ii) an appearance frequency that satisfies the performance appearance frequency degree threshold condition, and wherein the relevance degree for the second target word is stored in said associative dictionary storage unit and the appearance frequency for the second target word is stored in said appearance frequency storage unit.

8. The information retrieval apparatus according to claim 1, wherein said related word obtaining unit includes:

a word obtaining unit configured to obtain, from said associative dictionary storage unit, the related word relevant to the search word and the relevance degree for the related word with respect to the search word;
an appearance frequency obtaining unit configured to obtain, from said appearance frequency storage unit, the appearance frequency for the related word obtained by said word obtaining unit;
a weight calculating unit configured to calculate a weight value for each related word obtained by said word obtaining unit, based on the relevance degree and the appearance frequency for the related word; and
a related word output unit configured to output each of the related words obtained by said word obtaining unit in descending order of the weight values calculated for each of the related words.

9. The information retrieval apparatus according to claim 8,
wherein in said appearance frequency storage unit, a ratio of (i) pieces of text including the word stored in said associative dictionary unit to (ii) total pieces of text including another word of a same word type as the word is stored as an appearance frequency for the word, when the words stored in said associative dictionary storage unit are classified into word types.

10. The information retrieval apparatus according to claim 8, further comprising:
a search condition history storage unit in which a search word that is entered and a word type of the search word are stored in association with each other;
an input tendency weight calculating unit configured to calculate, as an input tendency weight value for each word type, a ratio of words of the word type to total search words stored in said search condition history storage unit; and
an input tendency weight value storage unit in which the input tendency weight value calculated by said input tendency weight calculating unit is stored for each word type,
wherein said weight calculating unit is configured to calculate the weight values for each of the related words obtained by said word obtaining unit, based on the relevance degree and the appearance frequency for the related word and the input tendency weight value for the word type of the related word, the input tendency weight value being stored in said input tendency weight value storage unit.

11. The information retrieval apparatus according to claim 1, further comprising:
a word viewing frequency storage unit in which viewing frequency information is stored in association with a word included in the plural pieces of text to be searched, the viewing frequency information being information regarding a frequency with which the word appears in explanatory information of a program viewed by the user;
a threshold condition change unit configured (i) to obtain, when the search word is accepted by said search word acceptance unit, the viewing frequency information corresponding to the search word from said word viewing frequency storage unit, (ii) to change the unknown boom acquisition mode relevance degree threshold condition for the relevance degree, which is stored by said user search intent threshold storage unit, based on the obtained viewing frequency information, and (iii) to store the changed unknown boom acquisition mode relevance degree threshold condition for the relevance degree; and
a threshold condition obtaining unit configured to obtain, when the user search intent is obtained from said user search intent obtaining unit, the changed unknown boom acquisition mode relevance degree threshold condition and the unknown boom acquisition mode appearance frequency threshold condition,
wherein said related word obtaining unit is configured to obtain, as the related word relevant to the search word, a second target word having (i) a relevance degree with respect to the search word that satisfies the changed unknown boom acquisition mode relevance degree threshold condition and (ii) an appearance frequency that satisfies the unknown boom acquisition appearance mode frequency threshold condition, and
wherein the relevance degree for the second target word is stored in said associative dictionary storage unit and the appearance frequency for the second target word is stored in said appearance frequency storage unit.

12. An information retrieval method for retrieving a piece of text from plural pieces of text to be searched, using an associative dictionary storage unit, an appearance frequency storage unit, and a user search intent threshold storage unit, said information retrieval method comprising:
storing, in the associative dictionary storage unit, (i) two arbitrary words from among words included in the plural pieces of text to be searched and (ii) a relevance degree indicating a strength of relevance between the two arbitrary words and having a large value when the relevance between the two arbitrary words is stronger;
storing, in the associative dictionary storage unit, the two arbitrary words and the relevance degree in association with each other;
storing, in the appearance frequency storage unit, (i) a word from among the words stored in the associative dictionary storage unit and (ii) an appearance frequency indicating a number of pieces of text, from among the plural pieces of text to be searched, in which the word appears;
storing, in the appearance frequency storage unit, the word and the appearance frequency in association with each other;
storing, in the user search intent threshold storage unit, (i) an unknown boom acquisition mode corresponding to a search intent of the user intending to retrieve a piece of text including a word that is unpredictable with respect to the search word and currently in fashion, (ii) an unknown boom acquisition mode relevance degree threshold condition that a relevance degree is equal to or below an unpredictability threshold, and (iii) an unknown boom acquisition mode appearance frequency threshold condition that an appearance frequency is equal to or above a frequency threshold;
storing, in the user search intent threshold storage unit, the unknown boom acquisition mode, the unknown boom acquisition mode relevance degree threshold condition, and the unknown boom acquisition mode appearance frequency threshold condition in association with each other;
accepting a search word;
obtaining a user search intent that indicates a search intent of a user;
obtaining, as a related word relevant to the search word, a target word having (i) a relevance degree with respect to the search word that satisfies the unknown boom acquisition mode relevance degree threshold condition that the relevance degree is equal to or below the unpredictability threshold and (ii) an appearance frequency that satisfies the unknown boom acquisition mode appearance frequency threshold condition that the appearance frequency is equal to or above the frequency threshold, when said obtaining obtains the unknown boom acquisition mode, wherein the relevance degree for the target word is stored in the associative dictionary storage unit and the appearance frequency for the first target word is stored in the appearance frequency storage unit; and retrieving a piece of text including the search word or the related word from the plural pieces of text to be searched.

13. A non-transitory computer readable recording medium having stored thereon a program for retrieving a piece of text from plural pieces of text to be searched, using an associative dictionary storage unit, an appearance frequency storage unit, and a user search intent threshold storage unit, wherein, when executed, said program causes a computer to execute a method comprising:

storing, in the associative dictionary storage unit, (i) two arbitrary words from among words included in the plural pieces of text to be searched and (ii) a relevance degree indicating a strength of relevance between the two arbitrary words and having a large value when the relevance between the two arbitrary words is stronger;

storing, in the associative dictionary storage unit, the two arbitrary words and the relevance degree in association with each other;

storing, in the appearance frequency storage unit, (i) a word from among the words stored in the associative dictionary storage unit and (ii) an appearance frequency indicating a number of pieces of text, from among the plural pieces of text to be searched, in which the word appears;

storing, in the appearance frequency storage unit, the word and the appearance frequency in association with each other;

storing, in the user search intent threshold storage unit, (i) an unknown boom acquisition mode corresponding to a search intent of the user intending to retrieve a piece of text including a word that is unpredictable with respect to the search word and currently in fashion, (ii) an unknown boom acquisition mode relevance degree threshold condition that a relevance degree is equal to or below an unpredictability threshold, and (iii) an unknown boom acquisition mode appearance frequency threshold condition that an appearance frequency is equal to or above a frequency threshold;

storing, in the user search intent threshold storage unit, the unknown boom acquisition mode, the unknown boom acquisition mode relevance degree threshold condition, and the unknown boom acquisition mode appearance frequency threshold condition in association with each other;

accepting a search word;

obtaining a user search intent that indicates a search intent of a user;

obtaining, as a related word relevant to the search word, a target word having (i) a relevance degree with respect to the search word that satisfies the unknown boom acquisition mode relevance degree threshold condition that the relevance degree is equal to or below the unpredictability threshold and (ii) an appearance frequency that satisfies the unknown boom acquisition mode appearance frequency threshold condition that the appearance frequency is equal to or above the frequency threshold, when said obtaining obtains the unknown boom acquisition mode, wherein the relevance degree for the target word is stored in the associative dictionary storage unit and the appearance frequency for the first target word is stored in the appearance frequency storage unit; and retrieving a piece of text including the search word or the related word from the plural pieces of text to be searched.

* * * * *

UNITED STATES PATENT AND TRADEMARK OFFICE
CERTIFICATE OF CORRECTION

| | | |
|---|---|---|
| PATENT NO. | : 8,108,407 B2 | Page 1 of 1 |
| APPLICATION NO. | : 12/447333 | |
| DATED | : January 31, 2012 | |
| INVENTOR(S) | : Takashi Tsuzuki et al. | |

It is certified that error appears in the above-identified patent and that said Letters Patent is hereby corrected as shown below:

ON THE TITLE PAGE:

In Item (54), line 1, change "INFORMATIONN RETRIEVAL APPARATUS" to
--INFORMATION RETRIEVAL APPARATUS--

IN THE SPECIFICATIONS:

Column 1, line 1, should read:

--INFORMATION RETRIEVAL APPARATUS--

Signed and Sealed this
Fifth Day of June, 2012

David J. Kappos
*Director of the United States Patent and Trademark Office*